US012701563B2

(12) United States Patent
Fan

(10) Patent No.: US 12,701,563 B2
(45) Date of Patent: Aug. 4, 2026

(54) METHOD AND APPARATUS FOR CONFIGURING SCRAMBLING CODE RESOURCE, AND TERMINAL DEVICE AND NETWORK DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 441 days.

(21) Appl. No.: 18/369,369

(22) Filed: Sep. 18, 2023

(65) Prior Publication Data

US 2024/0008021 A1     Jan. 4, 2024

Related U.S. Application Data

(63) Continuation of application No. PCT/CN2021/083106, filed on Mar. 25, 2021.

(51) Int. Cl.
*H04W 72/044*     (2023.01)
*H04W 72/232*     (2023.01)

(52) U.S. Cl.
CPC ..... *H04W 72/0466* (2013.01); *H04W 72/232* (2023.01)

(58) Field of Classification Search
CPC ............ H04W 72/0466; H04W 72/232; H04L 25/03866
See application file for complete search history.

(56) References Cited

U.S. PATENT DOCUMENTS

| 10,038,481 | B2 | 7/2018 | Huang |
|---|---|---|---|
| 10,630,432 | B2 | 4/2020 | Kim |
| 10,924,233 | B2 | 2/2021 | Kim |

(Continued)

FOREIGN PATENT DOCUMENTS

| CN | 102340382 A | 2/2012 |
|---|---|---|
| CN | 107343297 A | 11/2017 |

(Continued)

OTHER PUBLICATIONS

Huawei et al. "Synchronization Signals for NR" 3GPP TSG RAN WG1 Meeting #88bis R1-1706187, Apr. 4, 2017 (Apr. 4, 2017), pp. 3-5.

(Continued)

*Primary Examiner* — Andrew Lee
(74) *Attorney, Agent, or Firm* — BAYES PLLC

(57)     ABSTRACT

Provided are a method and apparatus for configuring a scrambling resource, and a terminal device and a network device. A terminal device receives scrambling indication information sent by a network device, the scrambling indication information being used for determining at least one scrambling type of scrambling format; and the terminal device acquires at least one scrambling sequence on the basis of the at least one scrambling type of scrambling format determined according to the scrambling indication information, each of the at least one scrambling sequence being used for demodulating or scrambling a physical resource corresponding to the scrambling sequence.

19 Claims, 7 Drawing Sheets

A network device sends scrambling code indication information to a terminal device, and the terminal device receives the scrambling code indication information from the network device. The scrambling code indication information is used to determine a scrambling code format of at least one scrambling code category — 201

The terminal device acquires at least one scrambling code sequence on the basis of the scrambling code format of the at least one scrambling code category determined by the scrambling code indication information. Each of the at least one scrambling code sequence is used to demodulate or scramble a physical resource corresponding to the scrambling code sequence — 202

(56)  References Cited

U.S. PATENT DOCUMENTS

| | | | | |
|---|---|---|---|---|
| 2009/0041240 | A1* | 2/2009 | Parkvall | H04W 72/02 |
| | | | | 380/247 |
| 2015/0023265 | A1* | 1/2015 | Park | H04L 5/0035 |
| | | | | 370/329 |
| 2015/0381246 | A1 | 12/2015 | Huang et al. | |
| 2017/0171846 | A1* | 6/2017 | Zhao | H04W 74/0866 |
| 2017/0346610 | A1 | 11/2017 | Kim et al. | |
| 2018/0302195 | A1 | 10/2018 | Kim et al. | |
| 2020/0015282 | A1* | 1/2020 | Zhao | H04W 72/044 |
| 2020/0204411 | A1 | 6/2020 | Sun et al. | |
| 2020/0220671 | A1 | 7/2020 | Kim et al. | |
| 2020/0374925 | A1* | 11/2020 | Su | H04W 74/0833 |
| 2021/0007103 | A1* | 1/2021 | Chae | H04L 5/0053 |
| 2021/0232396 | A1* | 7/2021 | Arsanto | G06F 9/3016 |
| 2021/0345403 | A1* | 11/2021 | Kneckt | H04L 1/16 |
| 2022/0007346 | A1* | 1/2022 | Ma | H04L 5/0098 |
| 2022/0231784 | A1* | 7/2022 | Iyer | H04L 1/0067 |
| 2022/0368484 | A1* | 11/2022 | Kutz | H04L 27/261 |

FOREIGN PATENT DOCUMENTS

| | | |
|---|---|---|
| CN | 111277358 A | 6/2020 |
| WO | 2020087443 A1 | 5/2020 |

OTHER PUBLICATIONS

3GPP TS 38.321 V16.3.0 (Dec. 2020), "Technical Specification 3rd Generation Partnership Project; Technical Specification Group Radio Access Network; NR; Medium Access Control (MAC) protocol specification (Release 16)".

3GPP TS 38.331 V16.3.1 (Jan. 2021), "Technical Specification 3rd Generation Partnership Project; Technical Specification Group Radio Access Network; NR; Radio Resource Control (RRC) protocol specification (Release 16)".

International Search Report in the international application No. PCT/CN2021/083106, mailed on Jun. 2, 2021.

Written Opinion of the International Search Authority in the international application No. PCT/CN2021/083106, mailed on Jun. 2, 2021.

* cited by examiner

100

110

120　　　　　　　　　　　120

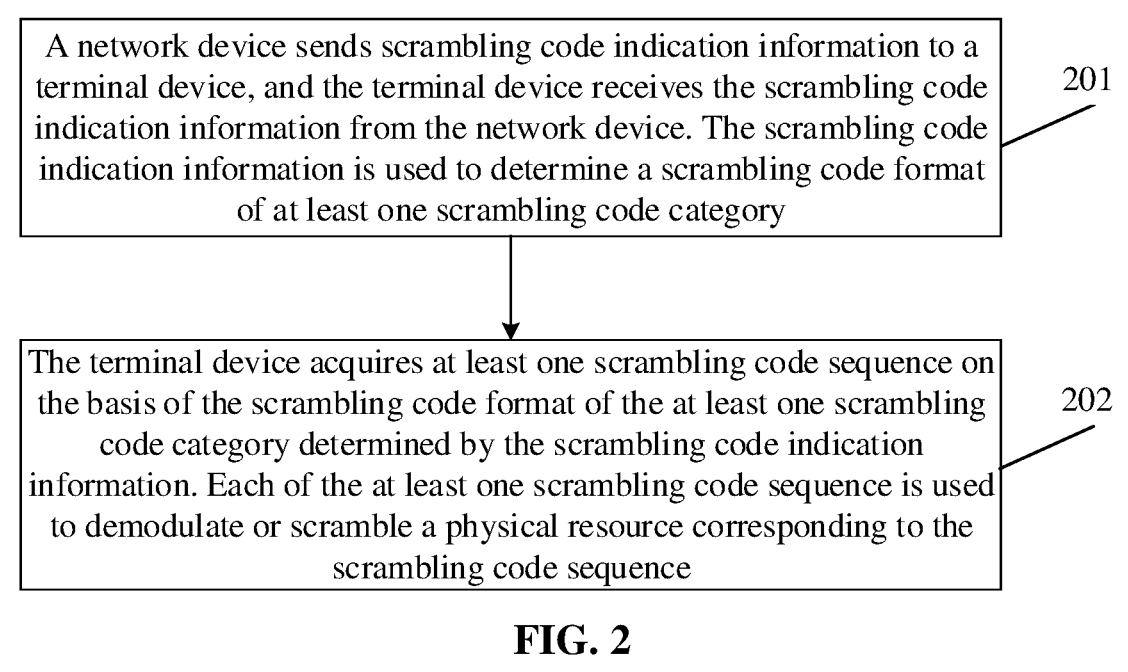

A network device sends scrambling code indication information to a terminal device, and the terminal device receives the scrambling code indication information from the network device. The scrambling code indication information is used to determine a scrambling code format of at least one scrambling code category    201

The terminal device acquires at least one scrambling code sequence on the basis of the scrambling code format of the at least one scrambling code category determined by the scrambling code indication information. Each of the at least one scrambling code sequence is used to demodulate or scramble a physical resource corresponding to the scrambling code sequence    202

FIG. 2

Apparatus for configuring
scrambling code resource

Receiving unit 301

Processing unit 302

Apparatus for configuring scrambling code resource

Sending unit 401

FIG. 4

METHOD AND APPARATUS FOR CONFIGURING SCRAMBLING CODE RESOURCE, AND TERMINAL DEVICE AND NETWORK DEVICE

CROSS-REFERENCE TO RELATED APPLICATION

This application is a continuation of International Patent Application No. PCT/CN2021/083106 filed on Mar. 25, 2021, the disclosure of which is hereby incorporated by reference in its entirety.

BACKGROUND

With the continuous expansion of communication scenarios in modern society, the types of terminal devices (simply referred to as terminal types) are continuously increasing. In order to reduce the deployment cost of communication base stations, one cell tends to provide communication services for one or more types of terminal devices at the same time. A large number of terminal devices simultaneously camping on one cell may cause tension in scrambling code resources of the cell, or even insufficient scrambling code resources. However, the communication system is generally an interference-limited system, and the shortage of scrambling code resources may increase the average bit error rate of system data reception, which is disadvantageous to the experience of the terminal devices.

SUMMARY

Embodiments of the present application relate to the technical field of mobile communications, and specifically to a method and an apparatus for configuring a scrambling code resource, a terminal device, and a network device.

A method of configuring a scrambling code resource provided in an embodiment of the present application includes the following operations.

A terminal device receives scrambling code indication information sent by a network device, the scrambling code indication information being used to determine a scrambling code format of at least one scrambling code category.

The terminal device acquires at least one scrambling code sequence on the basis of the scrambling code format of the at least one scrambling code category determined by the scrambling code indication information. Each of the at least one scrambling code sequence is used to demodulate or scramble a physical resource corresponding to the scrambling code sequence.

A method of configuring a scrambling code resource provided in an embodiment of the present application includes the following operations.

A network device sends scrambling code indication information to a terminal device, the scrambling code indication information being used to determine a scrambling code format of at least one scrambling code category.

The scrambling code format of the at least one scrambling code category is used to acquire at least one scrambling code sequence, and each of the at least one scrambling code sequence is used to demodulate or scramble a physical resource corresponding to the scrambling code sequence.

Provided in embodiments of the present application is a terminal device, which comprises a processor and a transceiver. The processor is configured to control the transceiver to perform the method for configuring the scrambling code resource described above.

Provided in embodiments of the present application is a network device, which comprises a processor and a transceiver. The processor is configured to control the transceiver to perform the method for configuring the scrambling code resource described above.

BRIEF DESCRIPTION OF THE DRAWINGS

The drawings illustrated here are used to provide a further understanding of the present application, and constitute a part of the present application. The illustrative embodiments of the present application and the description thereof are used to explain the present application, and do not constitute an improper limitation to the present application. In the drawings:

FIG. 2 is a schematic flowchart of a method for configuring a scrambling code resource provided in an embodiment of the present application;

FIG. 4 is a second schematic structural composition diagram of an apparatus for configuring a scrambling code resource provided in an embodiment of the present application;

DETAILED DESCRIPTION

The technical solutions in the embodiments of the present application are described below with reference to the drawings in the embodiments of the present application.

Evidently, the described embodiments are part of the embodiments of the present application, rather than all of the embodiments. All other embodiments that are arrived at by a person of ordinary skill in the art on the basis of the embodiments in the present application without creative work belong to the scope of protection of the present application.

The technical solutions of the embodiments of the present application may be applied to various communication systems, such as Long Term Evolution (LTE) systems, LTE Frequency Division Duplex (FDD) systems, LTE Time Division Duplex (TDD) systems, 5G communications systems, or future communication systems, etc.

Figure 1:
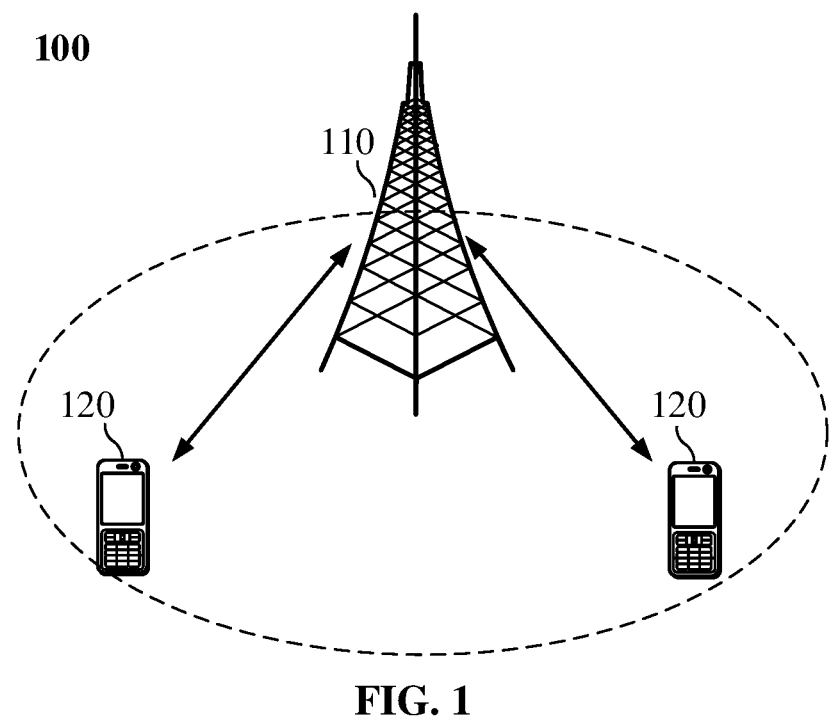
FIG. 1 is a schematic diagram of a communication system architecture provided in an embodiment of the present application.

As an example, FIG. 1 illustrates a communication system 100 applied in an embodiment of the present application. The communication system 100 may include a network device 110, and the network device 110 may be a device that performs communication with a terminal 120 (or referred to as a communication terminal or a terminal). The network device 110 may provide communication coverage for a particular geographic area, and may perform communication with a terminal located within the coverage area. Optionally, the network device 110 may be an Evolved Node B (eNB or eNodeB) in an LTE system, or a wireless controller in a Cloud Radio Access Network (CRAN), or the network device may be a mobile switching center, a relay station, an access point, a vehicle-mounted device, a wearable device, a hub, a switch, a bridge, a router, a network-side device in a 5G network or a network device in a future communication system, etc.

The communication system 100 further includes at least one terminal 120 within the coverage range of the network device 110. The "terminal" as used herein includes, but is not limited to, an apparatus configured to receive/send a communication signal and/or an Internet of Things (IoT) device, which may be connected via a wired line, such as a Public Switched Telephone Network (PSTN), a Digital Subscriber Line (DSL), a digital cable, and a direct cable connection; and/or via another data connection/network; and/or via a wireless interface, such as a cellular network, a wireless local area network (WLAN), a digital TV network such as a DVB-H network, a satellite network or an AM-FM broadcast transmitter; and/or another terminal. A terminal configured to perform communication by means of a wireless interface may be referred to as a "wireless communication terminal", a "wireless terminal" or a "mobile terminal". Examples of the mobile terminal include, but are not limited to, a satellite or cellular phone; a Personal Communications System (PCS) terminal that can combine a cellular radio phone with data processing, fax, and data communication capability; a PDA that may include a radio phone, a pager, Internet/intranet access, a Web browser, a memo pad, a calendar, and/or a Global Positioning System (GPS) receiver; and a conventional laptop and/or handheld receiver or other electronic apparatuses including radio telephone transceivers. The terminal may refer to an access terminal, a user equipment (UE), a user unit, a user station, a mobile station, a mobile site, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a 5G network, a terminal device in a future evolved PLMN, or the like.

Optionally, Device to Device (D2D) communication may be performed between the terminals 120.

Optionally, the 5G communication system or the 5G network may also be referred to as a New Radio (NR) system or an NR network.

FIG. 1 illustratively shows one network device and two terminals. Optionally, the communication system 100 may include a plurality of network devices, and the coverage range of each network device may include other numbers of terminals, which is not limited thereto in the present application.

Optionally, the communication system 100 may further include a network controller, a mobile management entity, and other network entities, which is not limited thereto in the present application.

It should be understood that a device having a communication function in the network/system in the embodiments of the present application may be referred to as a communication device. Taking the communication system 100 shown in FIG. 1 as an example, the communication device may include a network device 110 and a terminal 120 that have a communication function. The network device 110 and the terminal 120 may be the specific devices described above, which will not be repeated here. The communication device may also include other devices in the communication system 100, such as a network controller, a mobile management entity and other network entities, which is not limited thereto in the present application.

It is to be understood that the terms "system" and "network" herein are often used interchangeably herein. The term "and/or" herein is merely to describe the associations of associated objects, indicating that there can be three kinds of relationships. For example, A and/or B can indicate three situations in which A exists alone, A and B exist simultaneously, or B exists alone. In addition, the character "/" herein generally indicates that the associated objects before and after this character are in an "or" relationship.

To facilitate the understanding of the technical solutions of the embodiments of the present application, related technologies of the embodiments of the present application are described below. The following related technologies can be arbitrarily combined with the technical solutions of the embodiments of the present application as optional solutions, all of which belong to the scope of protection of the embodiments of the present application.

Overview of 5G Technology

With people's pursuit of speed, delay, high-speed mobility and energy efficiency, and the diversity and complexity of services in future life, the $3^{rd}$ Generation Partnership Project (3GPP) international standards organization began to develop 5G. The main application scenarios of 5G are: enhanced Mobile Broadband (eMBB), Ultra-Reliable Low-Latency Communications (URLLC), and massive Machine-Type Communications (mMTC).

On the one hand, eMBB is still aimed at users obtaining multimedia content, services and data, and its requirements are growing rapidly. On the other hand, since eMBB may be deployed in different scenarios, such as indoors, in urban areas, in rural areas etc., the capabilities and requirements thereof vary greatly, and so cannot be generalized and must be analyzed in detail in combination with specific deployment scenarios. Typical applications for URLLC include: industrial automation, power automation, remote medical operations (surgery), traffic security protection, etc. Typical characteristics of mMTC include: high connection density, small data amount, latency-insensitive traffic, low cost and long lifetime of modules, etc.

In order to reduce air interface signaling, quickly restore wireless connections, and quickly restore data services, 5G defines a new Radio Resource Control (RRC) state, i.e., an RRC inactive (RRC_INACTIVE) state. This state is different from an RRC idle (RRC_IDLE) state and an RRC active (RRC_ACTIVE) state. Among them, 1) RRC_IDLE state (simply referred to as idle state): mobility is terminal device-based cell selection and reselection, paging is initiated by a Core Network (CN), and paging areas are configured by the CN. There is no terminal device context on the base station side, and there is no RRC connection.

2) RRC_CONNECTED state (simply referred to as connected state): there is an RRC connection, and there is a terminal device context on a base station side and a terminal device side. A network device knows that the location of a terminal device is at the level of a specific cell. Mobility is mobility controlled by the network device. Unicast data may be transmitted between the terminal device and a base station.

3) RRC_INACTIVE state (simply referred to as an inactive state): mobility is terminal device-based cell selection and reselection; there is a connection between the CN and NR; the terminal device context exists on a base station;

paging is triggered by a Radio Access Network (RAN); RAN-based paging areas are managed by the RAN; and the network device knows that the location of the terminal device is at the level of an RAN-based paging area.

Division Principle of Wireless Communication System Resources

Wireless communication system resources are divided according to at least one dimension of the following: frequency domain, time domain, code domain, and spatial domain. Frequency domain division refers to dividing resources according to a frequency-point dimension; time domain division refers to dividing resources according to a time dimension; code domain division refers to dividing resources according to a plurality of scrambling dimensions; and spatial domain division refers to dividing resources according to a spatial dimension.

There are many kinds of scrambling codes according to different purposes thereof. As an example, several scrambling codes are listed below:

Cell-Radio Network Temporary Identifier (C-RNTI): C-RNTI is a scrambling code for a terminal device to receive scheduling information at one cell, and the value thereof is dynamically configured by a network device;

Paging-Radio Network Temporary Identifier (P-RNTI): P-RNTI is a scrambling code used by the terminal device when receiving paging control information, and the value thereof is fixed; and System Information-Radio Network Temporary Identifier (SI-RNTI): SI-RNTI is a scrambling code used by the terminal device when receiving system information, and the value thereof is fixed.

With the continuous expansion of communication scenarios in modern society, the types of terminal devices (simply referred to as terminal types) are continuously increasing, such as: NB-IoT terminal type, eMTC terminal type, eMBB terminal type, IIoT terminal type, etc. In order to save the deployment cost of communication base stations, one cell tends to provide communication services for one or more types of terminal devices at the same time. A large number of terminal devices simultaneously camping on one cell may cause tension in scrambling code resources of the cell, or even insufficient scrambling code resources. However, the communication system is generally an interference-limited system, and the shortage of scrambling code resources may increase the average bit error rate of system data reception, which is disadvantageous to the experience of the terminal devices. For this reason, the following technical solutions of the embodiments of the present application are proposed.

It should be noted that a "terminal device" described in the embodiments of the present application may also be replaced with a "terminal" or a "user equipment".

FIG. 2 is a schematic flowchart of a method for configuring a scrambling code resource provided in an embodiment of the present application. As shown in FIG. 2, the method for configuring the scrambling code resource includes the following operations.

In block 201, a network device sends scrambling code indication information to a terminal device, and the terminal device receives the scrambling code indication information sent by the network device. The scrambling code indication information is used to determine a scrambling code format of at least one scrambling code category.

In an embodiment of the present application, the scrambling code indication information is carried in AS signaling and sent by the network device to the terminal device. The network device here refers to an access network device, such as a base station.

In some optional implementations, the AS signaling may be system broadcast information or dedicated signaling. In other words, the scrambling code indication information is carried in the system broadcast information or dedicated signaling.

In block 202, the terminal device acquires at least one scrambling code sequence on the basis of the scrambling code format of the at least one scrambling code category determined by the scrambling code indication information. Each of the at least one scrambling code sequence is used to demodulate or scramble a physical resource corresponding to the scrambling code sequence.

In an embodiment of the present application, the scrambling code indication information is used to determine a scrambling code format of at least one scrambling code category, and the scrambling code format of the at least one scrambling code category is used to acquire at least one scrambling code sequence.

It should be noted that the description of "acquiring at least one scrambling code sequence" in the embodiments of the present application may also be replaced with "generating at least one scrambling code sequence" or "selecting at least one scrambling code sequence".

In some optional implementations, the at least one scrambling code category includes at least one of the following: a Radio Access Technology (RAT) public type of scrambling codes, a cell public type of scrambling codes, and a terminal granularity type of scrambling codes.

In some optional implementations, after acquiring the at least one scrambling code sequence on the basis of the scrambling code format of the at least one scrambling code category determined by the scrambling code indication information, the terminal device demodulates or scrambles a physical resource corresponding to the scrambling code sequence on the basis of at least a part of the at least one scrambling code sequence.

In some optional implementations, the physical resource includes at least one of the following resources: a paging channel resource, a broadcast channel resource, a downlink shared channel resource, an uplink shared channel resource, and a random access channel resource.

A specific implementation of the scrambling code indication information and how the terminal device acquires the scrambling code sequence will be described below.

Implementation of Scrambling Code Indication Information

A-1) Content of Scrambling Code Indication Information

In some optional implementations, the scrambling code indication information includes bit mapping information for indicating a scrambling code format of at least one scrambling code category.

Specifically, the bit mapping information includes at least one bit, each bit of the at least one bit or a bit combination formed by a plurality of bits is associated with one or more scrambling code categories, and the value of each bit or the bit combination is used to indicate the scrambling code format of the one or more scrambling code categories associated with each bit or the bit combination.

For a bit, the bit has 2 values. Each value of a bit may indicate one scrambling code format of one or more scrambling code categories associated with the bit. As an example, the value of the bit being a first value is used to indicate that the scrambling code format of one or more scrambling code categories associated with the bit is a first scrambling code format, and the value of the bit being a second value is used to indicate that the scrambling code format of the one or more scrambling code categories associated with the bit is a second scrambling code format. Here, the first value and the second value are 0 and 1, respectively.

For a bit combination, the bit combination has M values, and M=2^N, where N is the number of bits included in the bit combination. Each value of the bit combination may indicate one scrambling code format of one or more scrambling code categories associated with the bit combination. As an example, N=2 (that is, the bit combination includes 2 bits). The value of the bit combination being a first value is used to indicate that the scrambling code format of the one or more scrambling code categories associated with the bit combination is a first scrambling code format; the value of the bit combination being a second value is used to indicate that the scrambling code format of the one or more scrambling code categories associated with the bit combination is a second scrambling code format; the value of the bit combination being a third value is used to indicate that the scrambling code format of the one or more scrambling code categories associated with the bit combination is a third scrambling code format; and the value of the bit combination being a fourth value is used to indicate that the scrambling code format of the one or more scrambling code categories associated with the bit combination is a fourth scrambling code format. Here, the first value, the second value, the third value, and the fourth value are 00, 01, 10, and 11, respectively.

Table 1 schematically shows the content of bit mapping information. The bit mapping information includes N bits, where N is a positive integer greater than equal to 1. Each of the N bits is associated with one or more scrambling code categories, or a bit combination of the N bits is associated with one or more scrambling code categories. The value of each bit or the value of a bit combination may determine a scrambling code format of one or more scrambling code categories associated with the bit or bit combination. For example, if bit 1 is associated with scrambling code category 1, bit 2 is associated with scrambling code category 2, the value of bit 1 is 1, and the value of bit 2 is 0, then it is indicated that the scrambling code format of scrambling code category 1 is the first scrambling code format, and the scrambling code format of scrambling code category 2 is the second scrambling code format.

TABLE 1

| Bit mapping information | Bit 1 |
| | Bit 2 |
| | . . . |
| | Bit N |

B-1) Association Relationship Between Scrambling Code Indication Information and Scrambling Code Category In an embodiment of the present application, each bit or the bit combination in the bit mapping information and the scrambling code category have an association relationship (or referred to as a mapping relationship). The association relationship between each bit or bit combination in the scrambling code indication information and the one or more scrambling code categories is a first association relationship.

In some optional implementations, the first association relationship is predefined. For example, a protocol specifies the association relationship between the bits or the bit combination in the bit mapping information and the scrambling code categories.

In some optional implementations, the first association relationship is configured by a network device by means of access stratum (AS) signaling. The network device here refers to an access network device, such as a base station. In some optional implementations, the AS signaling may be a system broadcast message or dedicated signaling.

In some optional implementations, the terminal device may acquire the first association relationship according to description information for fields of the bits included in bit mapping information specified by a protocol.

In one example, the first association relationship is in a one-to-one form, that is, one bit in the bit mapping information is associated with one scrambling code category. Table 2 schematically shows an association relationship between the bits included in the bit mapping information and the scrambling code categories. The association relationship is in a one-to-one form, that is, one bit is associated with one scrambling code category. N in Table 2 is a positive integer greater than equal to 1.

TABLE 2

| First association relationship | |
| --- | --- |
| Bit 1 included in bit mapping information | Scrambling code category 1 |
| Bit 2 included in bit mapping information | Scrambling code category 2 |
| . . . | . . . |
| Bit N included in bit mapping information | Scrambling code category N |

In one example, the first association relationship is in a one-to-multiple form, that is, one bit in the bit mapping information is associated with multiple scrambling code categories. Table 3 schematically shows an association relationship between the bits included in the bit mapping information and the scrambling code categories. The association relationship is in a one-to-multiple form, that is, one bit is associated with multiple scrambling code categories. In Table 3, an example in which the bit mapping information includes two bits is used for illustration, where bit 1 is associated with scrambling code category 1 and scrambling code category 2, and bit 2 is associated with scrambling code category 3 to scrambling code category 5.

TABLE 3

| First association relationship | |
| --- | --- |
| Bit 1 included in bit mapping information | Scrambling code category 1 |
| | Scrambling code category 2 |
| Bit 2 included in bit mapping information | Scrambling code category 3 |
| | Scrambling code category 4 |
| | Scrambling code category 5 |

In one example, the first association relationship is in a multiple-to-one form, that is, a bit combination formed by a plurality of bits in the bit mapping information is associated with one scrambling code category. Table 4 schematically shows an association relationship between bits included in the bit mapping information and scrambling code categories. The association relationship is in a multiple-to-one form, that is, a bit combination formed by a plurality of bits is associated with one scrambling code category. In Table 4, an example in which the bit mapping information includes 5 bits is used for illustration, where a bit combination formed by bit 1 and bit 2 is associated with scrambling code category 1, and a bit combination formed by bit 3 to bit 5 is associated with scrambling code category 2.

TABLE 4

| First association relationship | |
| --- | --- |
| Bit combination formed by bit 1 and bit 2 included in bit mapping information | Scrambling code category 1 |
| Bit combination formed by bit 3, bit 4, and bit 5 included in bit mapping information | Scrambling code category 2 |

In one example, the first association relationship is in a multiple-to-multiple form, that is, a bit combination formed by a plurality of bits in the bit mapping information is associated with multiple scrambling code categories. Table 5 schematically shows an association relationship between bits included in the bit mapping information and scrambling code categories. The association relationship is in a multiple-to-multiple form, that is, a bit combination formed by a plurality of bits is associated with multiple scrambling code categories. In Table 5, an example in which the bit mapping information includes 5 bits is used for illustration, where a bit combination formed by bit 1 and bit 2 is associated with scrambling code category 1 and scrambling code category 2, and a bit combination formed by bit 3 to bit 5 is associated with scrambling code category 3 to scrambling code category 5.

TABLE 5

| First association relationship | |
| --- | --- |
| Bit combination formed by bit 1 and bit 2 included in bit mapping information | Scrambling code category 1 |
| | Scrambling code category 2 |
| Bit combination formed by bit 3, bit 4, and bit 5 included in bit mapping information | Scrambling code category 3 |
| | Scrambling code category 4 |
| | Scrambling code category 5 |

It should be noted that the scrambling code category in the scheme described above may be an radio access technology (RAT) public type of scrambling codes, a cell public type of scrambling codes, a terminal granularity type of scrambling codes, or the like. As an example, the RAT public type of scrambling codes include, for example, P-RNTI, SI-RNTI, or the like. The cell public type of scrambling codes include, for example, PCI or the like. The terminal granularity type of scrambling codes include, for example, C-RNTI, I-RNTI, or the like. The present application is not limited to the specific scrambling code category.

In the above scheme, the value of each bit or bit combination in the bit mapping information is used to indicate a scrambling code format of one or more scrambling code categories associated with the bit or the bit combination.

Here, the scrambling code format is used to determine a generation rule for generating of scrambling code sequence and/or a selection rule for selecting of scrambling code sequence type. In other words, one scrambling code format corresponds to a generation rule for generating of scrambling code sequence and/or a selection rule for selecting of scrambling code sequence type.

When the scrambling code format is used to determine the generation rule for generating of scrambling code sequence, the mode of using the scrambling code format is exemplified as follows.

For example, a protocol specifies that a terminal device generates a scrambling code sequence in the following two optional algorithms: algorithm 1: anti-interference algorithm; and algorithm 2: non-anti-interference algorithm.

Algorithm 1 and algorithm 2 are predefined in the protocol. The value of the bit or bit combination in the bit mapping information that is associated with a scrambling code category may be used to determine which algorithm should be used to generate a scrambling code sequence corresponding to the scrambling code category. As an example, scrambling code category 1 is associated with bit 1 in the bit mapping information, the value of bit 1 being '1' indicates that the terminal device generates a scrambling code sequence corresponding to scrambling code category 1 using algorithm 1, and the value of the bit 1 being '0' indicates that the terminal device generates a scrambling code sequence corresponding to scrambling code category 1 using algorithm 2. The meaning of the bit value being '1' or '0' may also be opposite, which is not limited thereto in the present application. Further, if the algorithm is indicated by the value of the bit combination, the more the number of bits included in the bit combination, the more the kinds of algorithms the bit combination can indicate.

When the scrambling code format is used to determine the scrambling code sequence type selection rule, the mode of using the scrambling code format is exemplified as follows.

For example, a protocol specifies that the scrambling code sequence used by the terminal device has the following two optional length types: sequence type 1: short scrambling code sequence; and sequence type 2: long scrambling code sequence. The lengths of sequence type 1 and sequence type 2 are predefined in the protocol. The value of the bit or bit combination in the bit mapping information that is associated with the scrambling code category may be used to determine which sequence type of scrambling code sequence should be selected. As an example, scrambling code category 1 is associated with bit 1 in the bit mapping information, the value of bit 1 being '1' indicates that the terminal device uses a scrambling code sequence corresponding to sequence type 1, and the value of the bit 1 being '0' indicates that the terminal device uses a scrambling code sequence corresponding to sequence type 2. The meaning of the bit value being '1' or '0' may also be opposite, and is not limited thereto in the present application. In addition, if the sequence type is indicated by the value of the bit combination, the more the number of bits included in the bit combination, the more the kinds of sequence types the bit combination can indicate.

C-1) Association Relationship Between Scrambling Code Indication Information and Terminal Types In an embodiment of the present application, all bits in the bit mapping information are associated with at least one scrambling code category, and the at least one scrambling code category and the terminal types have an association relationship (or referred to as a mapping relationship). The association relationship is referred to as a second association relationship, and the second association relationship includes that:

all scrambling code categories of the at least one scrambling code category are associated with a group of terminal types; or, each scrambling code category of the at least one scrambling code category is associated with a group of terminal types; or, multiple scrambling code categories of the at least one scrambling code category are associated with a group of terminal types.

In some optional implementations, the second association relationship is predefined. For example, a protocol specifies the association relationship between the scrambling code categories associated with the bit mapping information and the terminal types.

In some optional implementations, the second association relationship is configured by a network device by means of AS signaling. The network device here refers to an access network device, such as a base station. In some optional implementations, the AS signaling may be a system broadcast message or dedicated signaling.

In one example, the second association relationship is that all scrambling code categories of the at least one scrambling code category are associated with a group of terminal types. In other words, a group of terminal types are associated with all scrambling code categories associated with the bit mapping information. Table 6 schematically shows such a second association relationship, and the bit mapping information includes N bits, where N is a positive integer; the N bits are associated with M scrambling code categories, where M is a positive integer; and all scrambling code categories (i.e., the M scrambling code categories) are associated with a group of terminal types.

TABLE 6

| Second association relationship | |
| --- | --- |
| A group of terminal types | Scrambling code category 1 |
| | Scrambling code category 2 |
| | . . . |
| | Scrambling code category M |

In one example, the second association relationship is that each scrambling code category of the at least one scrambling code category is associated with a group of terminal types. In other words, a group of terminal types are associated with one scrambling code category associated with the bit mapping information. Table 7 schematically shows such a second association relationship, and the bit mapping information includes N bits, where N is a positive integer; the N bits are associated with M scrambling code categories, where M is a positive integer; and each scrambling code category of the M scrambling code categories is associated with a group of terminal types.

TABLE 7

| Second association relationship | |
| --- | --- |
| First group of terminal types | Scrambling code category 1 |
| Second group of terminal types | Scrambling code category 2 |
| . . . | . . . |
| Mth group of terminal type | Scrambling code category M |

In one example, the second association relationship is that multiple scrambling code categories of the at least one scrambling code category are associated with a group of terminal types. In other words, a group of terminal types are associated with multiple scrambling code categories associated with the bit mapping information. Table 8 schematically shows such a second association relationship, and the bit mapping information includes N bits, where N is a positive integer; the N bits are associated with M scrambling code categories, where M is a positive integer. Taking M being 5 as an example, a group of terminal types are associated with scrambling code category 1 and scrambling code category 2, and a group of terminal types are associated with scrambling code category 3 to scrambling code category 5.

TABLE 8

| Second association relationship | |
| --- | --- |
| First group of terminal types | Scrambling code category 1 |
| | Scrambling code category 2 |
| Second group of terminal types | Scrambling code category 3 |
| | Scrambling code category 4 |
| | Scrambling code category 5 |

It should be noted that for the association relationship between the scrambling code categories and the bits in the bit mapping information in Table 6 to Table 8 described above, reference may be made to the related schemes of the aforementioned "first association relationship". That is, any of the aforementioned schemes of the "first association relationship" may be implemented in conjunction with any of the schemes of the "second association relationship" here.

In an embodiment of the present application, the function of the second association relationship is to define the terminal types of terminal devices that can use the scrambling code formats indicated by the bit mapping information. Only the terminal devices belonging to the group of terminal types defined in the second association relationship may generate or select the corresponding scrambling code sequence using the scrambling code format indicated by the bit mapping information, otherwise, the terminal devices not belonging to the group of terminal types defined in the second association relationship generate or select the corresponding scrambling code sequence using a default or protocol predefined scrambling code format.

D-1) Mode for Terminal Device to Acquire Scrambling Code Sequence

Mode 1) In some optional implementations, the terminal device determines a scrambling code format of at least one scrambling code category on the basis of the first association relationship and the bit mapping information; and the terminal device acquires at least one scrambling code sequence on the basis of the scrambling code format of the at least one scrambling code category.

For this mode, it may be possible to combine the above schemes of A-1) and B-1) for implementation. Specifically, the terminal device may determine, according to the first association relationship, one or more scrambling code categories associated with the bit or the bit combination in the bit mapping information; determine, according to the value of the bit or the bit combination, a scrambling code format of one or more scrambling code categories associated with the bit or the bit combination; and generate or select one or more scrambling code sequences respectively corresponding to the one or more scrambling code categories using the scrambling code format. Further, the terminal device demodulates or scrambles a corresponding physical resource using the one or more scrambling code sequences. Here, the physical resource includes at least one of the following resources: a paging channel resource, a broadcast channel resource, a downlink shared channel resource, an uplink shared channel resource, and a random access channel resource. The type of the physical resource is not limited in the present application.

Mode 2) In some optional embodiments, the terminal device determines that its own terminal type is a first terminal type; if the terminal device determines, on the basis of the second association relationship, that the first terminal type belongs to the group of terminal types, the terminal device determines, on the basis of the first association relationship and the bit mapping information, a scrambling code format of at least one scrambling code category associated with the group of terminal types; and the terminal device acquires at least one scrambling code sequence on the basis of the scrambling code format of the at least one scrambling code category. Alternatively, if the terminal device determines, on the basis of the second association relationship, that the first terminal type does not belong to the group of terminal types, the terminal device determines a scrambling code format of the at least one scrambling code category on the basis of a default or protocol predefined mode; and the terminal device acquires at least one scrambling code sequence on the basis of the at least one scrambling code format of the scrambling code category.

For this mode, it may be possible to combine the above schemes of A-1), B-1), and C-1) for implementation. Specifically, the terminal device may determine whether its own terminal type belongs to the group of terminal types according to the second association relationship. Branch 1): if so, the terminal device may use the bit mapping information. The terminal device determines, according to the first association relationship, one or more scrambling code categories associated with the bit or the bit combination in the bit mapping information, determines, according to the value of the bit or the bit combination, a scrambling code format of one or more scrambling code categories associated with the bit or the bit combination, and generates or selects one or more scrambling code sequences respectively corresponding to the one or more scrambling code categories using the scrambling code format; and further, the terminal device demodulates or scrambles a corresponding physical resource using the one or more scrambling code sequences. Branch 2): if not, the terminal device generates or selects one or more scrambling code sequences respectively corresponding to one or more scrambling code categories using a default or protocol predefined scrambling code format of the one or more scrambling code categories; and further, the terminal device demodulates or scrambles a corresponding physical resource using the one or more scrambling code sequences.

In the above scheme, the terminal device may determine its own terminal type in the following mode of option 1 and option 2.

Option 1: the terminal device determines, on the basis of a capability supported by the terminal device or predefined information, that its own terminal type is a first terminal type.

Here, several terminal types may be directly specified in a protocol, such as: NB-IoT terminal type, eMTC terminal type, eMBB terminal type, IIoT terminal type, etc. The specified principles may take into account the capability supported by the terminal device, so that the terminal device can determine which terminal type it belongs to according to its own capability. Alternatively, when the terminal device leaves the factory, its terminal type is directly built into the terminal device as predefined information, so that the terminal device can determine which terminal type it belongs to according to the predefined information.

In some optional implementations, the capability supported by the terminal device includes at least one of the following: a maximum transmission power level supported by the terminal device; an application scenario supported by the terminal device; a dual connectivity capability supported by the terminal device; a carrier aggregation capability supported by the terminal device; a bandwidth combination capability supported by the terminal device; a bandwidth size supported by the terminal device; whether the terminal device supports receiving services in its own signed operator network; the number of transmitting antennas supported by the terminal device; and the number of receiving antennas supported by the terminal device. Application scenarios supported by the terminal device include, for example, only supporting satellite communication capabilities, only supporting ground communication capabilities, or supporting both ground and satellite communication capabilities.

Option 2: the terminal device receives non-access stratum (NAS) signaling sent by a network device, and determines, on the basis of the NAS signaling, that its own terminal type is the first terminal type.

Here, the NAS signaling is used to indicate that the terminal type of the terminal device is the first terminal type. The network device here refers to a core network device.

It should be noted that in terms of the manner in which the terminal device obtains the terminal type by means of NAS signaling, the terminal type is not fixed, but is flexibly assigned by the core network device. For example, when terminal device A receives a service in core network 1, core network 1 considers that terminal device A belongs to terminal type 1, and notifies terminal device A of belonging to terminal type 1 by means of NAS signaling; and when terminal device A receives a service in core network 2, core network 2 considers that terminal device A belongs to terminal type 2, and notifies terminal device A of belonging to terminal type 2 by means of NAS signaling.

The manner in which the terminal type is determined by the core network device is flexible and safe. Before the terminal device receives the terminal type from the core network device by means of the NAS signaling, the terminal device may also report feature information of the terminal device itself to the core network device by means of uplink NAS signaling. The feature information includes at least the capabilities of the terminal device, such as: CA capability, DC capability, supported bandwidth combination, etc. The feature information may further include factory information of the terminal device, manufacturer's pre-configuration information or the like. It should be emphasized that when the core network device generates information of terminal type, it does not necessarily depend on the feature information reported by the terminal device. As can be seen, when the core network device generates the information of terminal type, both the feature information reported by the terminal device and the local policy information of the core network may be taken into account; or, when the core network device generates the terminal type information, only the local policy information of the core network is taken into account, which is not limited thereto in the present application.

The local policy information of the core network described above may include policy information of some operators and home access control policy information of some core networks.

Implementation II of Scrambling Code Indication Information

A-2) Content of Scrambling Code Indication Information

In some optional implementations, the scrambling code indication information includes first configuration information for indicating a scrambling code format of at least one scrambling code category.

Specifically, the implementation of the first configuration information may have the following several schemes.

Scheme I) The first configuration information includes at least one configuration entry, each of the at least one configuration entry includes indication information of one or more scrambling code categories and scrambling code format configuration information, and the scrambling code format configuration information is used to determine a scrambling code format of the one or more scrambling code categories.

It should be noted that the one or more scrambling code categories associated with the scrambling code format configuration information are explicitly configured. That is, indication information of one or more scrambling code categories is explicitly configured in the configuration entry where the scrambling code format configuration information is located.

Here, the indication information of the scrambling code category is a number of the scrambling code category; or the indication information of the scrambling code category is identifier information of the scrambling code category.

For example, number 0 represents scrambling code category 1, number 1 represents scrambling code category 2, and so on. For another example, identifier 1 represents scrambling code category 1, identifier 2 represents scrambling code category 2, and so on.

It should be noted that the terminal device and the network device have the same understanding for the identifier information of the scrambling code, so as to ensure that the terminal device and the network device use the same scrambling code sequence to scramble or descramble a corresponding physical resource.

In one example, in the first configuration information, each configuration entry includes indication information of one scrambling code category and corresponding scrambling code format configuration information. Table 9 schematically shows the first configuration information, and the first configuration information includes L configuration entries, where L is a positive integer; and each configuration entry includes indication information of one scrambling code category and corresponding scrambling code format configuration information.

TABLE 9

| First configuration information | Indication information of scrambling code category 1 | Scrambling code format configuration information 1 |
| | Indication information of scrambling code category 2 | Scrambling code format configuration information 2 |
| | . . . | . . . |
| | Indication information of scrambling code category L | Scrambling code format configuration information L |

In one example, in the first configuration information, at least a part of the configuration entries include indication information of multiple scrambling code categories and corresponding scrambling code format configuration information. Table 10 schematically shows the first configuration information, and the first configuration information includes L configuration entries, where L is a positive integer. Taking L being 2 as an example, a first configuration entry includes indication information of scrambling code category 1 and scrambling code category 2, and corresponding scrambling code format configuration information 1, and a second configuration entry includes indication information of scrambling code category 3 to scrambling code category 5 and corresponding scrambling code format configuration information 2.

TABLE 10

| First configuration information | Indication information of scrambling code category 1 | Scrambling code format configuration |
| | Indication information of scrambling code category 2 | information 1 |

TABLE 10-continued

| | Indication information of scrambling code category 3 | Scrambling code format configuration |
| | Indication information of scrambling code category 4 | information 2 |
| | Indication information of scrambling code category 5 | |

Scheme II) The first configuration information includes at least one configuration entry, each of the at least one configuration entry includes scrambling code format configuration information associated with one or more scrambling code categories, and the scrambling code format configuration information is used to determine a scrambling code format of the associated one or more scrambling code categories.

It should be noted that one or more scrambling code categories associated with the scrambling code format configuration information is implicitly determined. Specifically, the association relationship between the scrambling code format configuration information and the one or more scrambling code categories is determined on the basis of predefined information. In other words, the association relationship between the scrambling code format configuration information and the scrambling code category is predefined by means of a protocol.

For example, the protocol specifies that 4 bits are used to indicate 2 pieces of scrambling code format configuration information, where the first 2 bits are used to indicate scrambling code format configuration information 1 for scrambling code category 1, and the last 2 bits are used to indicate scrambling code format configuration information 2 for scrambling code category 2. 4 bits corresponding to two piece of scrambling code format configuration information is only described here as an example, and the present application does not exclude a general scenario in which M bits are used to indicate N pieces of scrambling code format configuration information, where M is a positive integer greater than N, and optionally, M is an integer multiple of N. For example, the protocol specifies that 15 bits are used to indicate 5 pieces of scrambling code format configuration information. According to the order of bits, every 3 bits indicate scrambling code format configuration information corresponding to one scrambling code type. The scrambling code type associated with the scrambling code format configuration information is implicitly given by logical position information of the bits corresponding to the scrambling code format configuration information, so it is called an implicit configuration mode.

In one example, in the first configuration information, each configuration entry includes one piece of scrambling code format configuration information. Table 11 schematically shows the first configuration information, and the first configuration information includes 6 bits, every 2 bits of which correspond to one configuration entry. The scrambling code format configuration information is indicated by the values of 2 bits, and one or more scrambling code categories associated with the scrambling code format configuration information are implicitly indicated by the positions of the 2 bits. Table 11 exemplarily illustrates that the scrambling code format configuration information is associated with one scrambling code category, which is not limited thereto in the present application, and the scrambling code format configuration information may also be associated with a plurality of scrambling code categories.

TABLE 11

| First configuration information | | | | | |
|---|---|---|---|---|---|
| Scrambling code format configuration information 1 (associated scrambling code category 1) | | Scrambling code format configuration information 2 (associated scrambling code category 2) | | Scrambling code format configuration information 3 (associated scrambling code category 3) | |
| Bit 1 | Bit 2 | Bit 3 | Bit 4 | Bit 5 | Bit 6 |

It should be noted that Table 11 exemplarily illustrates that each configuration entry occupying the same number of bits (i.e., 2 bits), which is not limited thereto in the present application, and the number of bits occupied by different configuration entries may also be different. The protocol may specify the order of configuration entries and the number of bits occupied thereby. Further, the order of configuration entries in the protocol defines the association relationship between the scrambling code format configuration information and the scrambling code categories.

In an embodiment of the present application, the terminal device may determine, according to the scrambling code format configuration information, a scrambling code format of one or more scrambling code categories associated with the code format configuration information. Here, one or more scrambling code categories associated with the scrambling code format configuration information, may be explicitly configured by scheme I) described above, or may also be implicitly configured by scheme II) described above. The scrambling code format configuration information is used for indicating a scrambling code format. Specifically, the scrambling code format configuration information includes p bits, where p is a positive integer; and the values of the p bits are used to indicate scrambling code formats, and the p bits may indicate p^2 scrambling code formats. Taking p=2 as an example, the scrambling code format configuration information includes two bits. Four values of '00', '01', '10', and '11' are used to represent four scrambling code formats, and if the scrambling code format configuration information does not appear, the terminal device uses a default scrambling code format; or, three values of '01', '10', and '1,' are used to represent three scrambling code formats, and the value '00' is used to represent the use of a default scrambling code format. In the above description, the scrambling code format configuration information including two bits is only described as an example, and the case that the scrambling code format configuration information includes three or more bits is not excluded. It should be emphasized that the meanings of the values of the bit combinations described above are just an example, and the present application does not exclude other definition modes in which the meanings of the values of the bit combinations are interchanged.

Here, for the meaning of the scrambling code format, reference may be made to the description of the aforementioned related schemes. Simply speaking, the scrambling code format is used to determine a generation rule for generating of scrambling code sequence and/or a selection rule for selecting of scrambling code sequence type. In other words, one scrambling code format corresponds to one generation rule for generating of scrambling code sequence and/or one selection rule for selecting of scrambling code sequence type.

The values of the p bits corresponding to the scrambling code format configuration information are used to indicate a generation rule for generating of scrambling code sequence and/or a selection rule for selecting of scrambling code sequence type.

B-2) Association Relationship Between Scrambling Code Indication Information and Terminal Types In an embodiment of the present application, the at least one configuration entry in the first configuration information and the terminal types has a third association relationship, and the third association relationship includes that:

all configuration entries in the first configuration information are associated with a group of terminal types; or, each configuration entry in the first configuration information is associated with a group of terminal types; or, multiple configuration entries in the first configuration information are associated with a group of terminal types.

In some optional implementations, the third association relationship is predefined. For example, a protocol specifies the association relationship between the configuration entries in the first configuration information and the terminal types.

In some optional implementations, the third association relationship is configured by a network device by means of AS signaling. The network device here refers to an access network device, such as a base station. In some optional implementations, the AS signaling may be a system broadcast message or dedicated signaling.

In one example, the third association relationship is that all configuration entries in the first configuration information are associated with a group of terminal types. In other words, a group of terminal types are associated with all configuration entries in the first configuration information. Tables 12-1 and 12-2 schematically show such a third association relationship. Referring to Table 12-1, the first configuration information includes L pieces of scrambling code format configuration information, where L is a positive integer; and all the scrambling code format configuration information (i.e., L pieces of scrambling code format configuration information) are associated with a group of terminal types. It should be noted that Table 12-1 exemplarily illustrates one piece of scrambling code format configuration information being associated with one scrambling code category is illustrated as an example. The present application is not limited thereto, and one piece of scrambling code format configuration information may also be associated with multiple scrambling code categories. Referring to Table 12-2, first configuration information includes L pieces of scrambling code format configuration information, where L is a positive integer. Taking L=3 as an example, all the scrambling code format configuration information (i.e., 3 pieces of scrambling code format configuration information) are associated with a group of terminal types. It should be noted that in Table 12-2, one piece of scrambling code format configuration information being associated with one scrambling code category is illustrated as an example. The present application is not limited thereto, and one piece of scrambling code format configuration information may also be associated with multiple scrambling code categories.

TABLE 12-1

| Third Association Relationship | First configuration information | Indication information of scrambling code category 1 | Scrambling code format configuration information 1 |
|---|---|---|---|
| | | Indication information of scrambling code category 2 | Scrambling code format configuration information 2 |
| | | . . . | . . . |
| | | Indication information of scrambling code category L | Scrambling code format configuration information L |
| A group of terminal types | | | |

TABLE 12-2

| Third Association Relationship | | | |
|---|---|---|---|
| | First configuration information | | |
| A group of terminal types | Scrambling code format configuration information 1 (associated scrambling code category 1) | Scrambling code format configuration information 2 (associated scrambling code category 2) | Scrambling code format configuration information 3 (associated scrambling code category 3) |
| | Bit 1     Bit 2 | Bit 3     Bit 4 | Bit 5     Bit 6 |

It should be noted that the association relationship between the scrambling code format configuration information and the scrambling code categories in Table 12-1 is explicitly configured, and the association relationship between the scrambling code format configuration information and the scrambling code categories in Table 12-2 is implicitly configured. For details, please refer to the aforementioned relevant scheme of A-2).

In one example, the third association relationship is that each configured entry in the first configuration information is associated with a group of terminal types. In other words, a group of terminal types are associated with one configuration entry in the first configuration information. Tables 13-1 and 13-2 schematically show such a third association relationship. Referring to Table 13-1, the first configuration information includes L pieces of scrambling code format configuration information, where L is a positive integer; and each of the L pieces of scrambling code format configuration information is associated with a group of terminal types. It should be noted that in Table 13-1, one piece of scrambling code format configuration information being associated with one scrambling code category is illustrated as an example. The present application is not limited thereto, and one piece of scrambling code format configuration information may also be associated with multiple scrambling code categories. Referring to Table 13-2, the first configuration information includes L pieces of scrambling code format configuration information, where L is a positive integer. Taking L=3 as an example, each of 3 pieces of scrambling code format configuration information is associated with a group of terminal types. It should be noted that in Table 13-2, one piece of scrambling code format configuration information being associated with one scrambling code category is illustrated as an example. The present application is not limited thereto, and one piece of scrambling code format configuration information may also be associated with multiple scrambling code categories.

TABLE 13-1

| Third Association Relationship | | |
|---|---|---|
| First configuration information | | |
| Indication information of scrambling code category 1 | Scrambling code format configuration information 1 | First group of terminal types |
| Indication information of scrambling code category 2 | Scrambling code format configuration information 2 | Second group of terminal types |
| . . . | . . . | . . . |
| Indication information of scrambling code category L | Scrambling code format configuration information L | Lth group of terminal types |

TABLE 13-2

| Third Association Relationship | | |
| --- | --- | --- |
| First configuration information | | |
| Bit 1 | Scrambling code format configuration | First group of |
| Bit 2 | information 1 | terminal types |
| | (Associated scrambling code category 1) | |
| Bit 3 | Scrambling code format configuration | Second group of | example, a group of terminal types are associated with scrambling code format configuration information 1 and scrambling code format configuration information 2, and a group of terminal types are associated with scrambling code format configuration information 3. It should be noted that in Table 14-2, one piece of scrambling code format configuration information being associated with one scrambling code category is illustrated as an example. The present application is not limited thereto, and one piece of scrambling code format configuration information may also be associated with multiple scrambling code categories.

TABLE 14-1

| First configuration information | | | |
| --- | --- | --- | --- |
| Third Association Relationship | Indication information of scrambling code category 1 | Scrambling code format configuration information 1 | First group of terminal types |
| | Indication information of scrambling code category 2 | Scrambling code format configuration information 2 | |
| | Indication information of scrambling code category 3 | Scrambling code format configuration information 3 | Second group of terminal types |
| | Indication information of scrambling code category 4 | Scrambling code format configuration information 4 | |
| | Indication information of scrambling code category 5 | Scrambling code format configuration information 5 | |

TABLE 13-2-continued

| Third Association Relationship | | |
| --- | --- | --- |
| First configuration information | | |
| Bit 4 | information 2 | terminal types |
| | (Associated scrambling code category 2) | |
| Bit 5 | Scrambling code format configuration | Third group of |
| Bit 6 | information 3 | terminal types |
| | (Associated scrambling code category 3) | |

It should be noted that the association relationship between the scrambling code format configuration information and the scrambling code categories in Table 13-1 is explicitly configured, and the association relationship between the scrambling code format configuration information and the scrambling code categories in Table 13-2 is implicitly configured. For details, please refer to the aforementioned relevant scheme of A-2).

In one example, the third association relationship is that multiple configuration entries in the first configuration information are associated with a group of terminal types. In other words, a group of terminal types are associated with multiple configuration entries in the first configuration information. Tables 14-1 and 14-2 schematically show such a third association relationship. Referring to Table 14-1, the first configuration information includes L scrambling code format configuration information, where L is a positive integer. Taking L=5 as an example, a group of terminal types are associated with scrambling code format configuration information 1 and scrambling code format configuration information 2, and a group of terminal types are associated with scrambling code format configuration information 3 to scrambling code format configuration information 5. It should be noted that in Table 14-1, one piece of scrambling code format configuration information being associated with one scrambling code category is illustrated as an example. The present application is not limited thereto, and one piece of scrambling code format configuration information may also be associated with multiple scrambling code categories. Referring to Table 14-2, the first configuration information includes L pieces of scrambling code format configuration information, where L is a positive integer. Taking L=3 as an

TABLE 14-2

| Third Association Relationship | | |
| --- | --- | --- |
| First configuration information | | |
| Bit 1 | Scrambling code format configuration | First group of |
| Bit 2 | information 1 | terminal types |
| | (Associated scrambling code category 1) | |
| Bit 3 | Scrambling code format configuration | |
| Bit 4 | information 2 | |
| | (Associated scrambling code category 2) | |
| Bit 5 | Scrambling code format configuration | Second group of |
| Bit 6 | information 3 | terminal types |
| | (Associated scrambling code category 3) | |

It should be noted that the association relationship between the scrambling code format configuration information and the scrambling code categories in Table 14-1 is explicitly configured, and the association relationship between the scrambling code format configuration information and the scrambling code categories in Table 14-2 is implicitly configured. For details, please refer to the aforementioned relevant scheme of A-2).

In an embodiment of the present application, the function of the third association relationship is to define terminal types of terminal devices that can use the scrambling code formats indicated by the first configuration information. Only the terminal devices belonging to the group of terminal types defined in the third association relationship may generate or select a corresponding scrambling code sequence using the scrambling code formats indicated by the first configuration information, otherwise, the terminal devices not belonging to the group of terminal types defined in the third association relationship generate or select the corresponding scrambling code sequence using a default or protocol predefined scrambling code format.

C-2) Mode for Terminal Device to Acquire Scrambling Code Sequence

Mode 1) In some optional implementations, the terminal device determines, on the basis of the first configuration information, a scrambling code format of at least one scrambling code category; and the terminal device acquires at least one scrambling code sequence on the basis of the scrambling code format of the at least one scrambling code category.

For this mode, it may be possible to combine the above scheme of A-2) for implementation. Specifically, the terminal device determines a scrambling code format of the at least one scrambling code category according to the first configuration information, and generates or selects at least one scrambling code sequence respectively corresponding to the at least one scrambling code category using the scrambling code format. Further, the terminal device demodulates or scrambles a corresponding physical resource using the at least one scrambling code sequences. Here, the physical resource includes at least one of the following resources: a paging channel resource, a broadcast channel resource, a downlink shared channel resource, an uplink shared channel resource, and a random access channel resource. The type of the physical resource is not limited in the present application.

It should be noted that the terminal device may determine the scrambling code format according to the scrambling code format configuration information in the first configuration information, and which scrambling code format(s) of the scrambling code category the scrambling code format is may be determined according to the indication information of the scrambling code category explicitly configured in the first configuration information or according to protocol regulations. For details, please refer to the aforementioned scheme of A-2).

Mode 2) In some optional embodiments, the terminal device determines that its own terminal type is a first terminal type; if the terminal device determines, on the basis of the third association relationship, that the first terminal type belongs to the group of terminal types, the terminal device determines a scrambling code format of at least one scrambling code category on the basis of a configuration entry in the first configuration information having an association relationship with the group of terminal types; the terminal device acquires at least one scrambling code sequence on the basis of the scrambling code format of the at least one scrambling code category; or, if the terminal device determines, on the basis of the third association relationship, that the first terminal type does not belong to the group of terminal types, the terminal device determines a scrambling code format of at least one scrambling code category on the basis of a default or protocol predefined mode; and the terminal device acquires at least one scrambling code sequence on the basis of the at least one scrambling code format of the scrambling code category.

For this mode, it may be possible to combine the above schemes of A-2) and B-2) for implementation. Specifically, the terminal device may determine whether its own terminal type belongs to the group of terminal types according to the second association relationship. Branch 1): if so, the terminal device may use the first configuration information. The terminal device determines a scrambling code format of one or more scrambling code categories according to the configuration entry having the association relationship with the group of terminal types in the first configuration information, and generates or selects at least one scrambling code sequence respectively corresponding to the at least one scrambling code category using the scrambling code format; and further, the terminal device demodulates or scramble a corresponding physical resource using the at least one scrambling code sequence. Branch 2): if not, the terminal device generates or selects one or more scrambling code sequences respectively corresponding to one or more scrambling code categories using a default or protocol predefined scrambling code format of the one or more scrambling code categories; and further, the terminal device demodulates or scrambles a corresponding physical resource using the one or more scrambling code sequences.

In the above scheme, the terminal device may determine its own terminal type in the following mode of option 1 and option 2.

Option 1: the terminal device determines that its own terminal type is a first terminal type on the basis of a capability supported by the terminal device or predefined information.

Option 2: the terminal device receives NAS signaling sent by a network device, and determines that its own terminal type is the first terminal type on the basis of the NAS signaling.

Activation or Deactivation of Scrambling Code Indication Information

In some optional implementations, after the terminal device receives the scrambling code indication information which is activated by default, the terminal device may use the scrambling code indication information directly.

In some optional implementations, after the terminal device receives the scrambling code indication information which may be activated or deactivated by default, a network device may send an activation or deactivation instruction to the terminal device to flexibly adjust the activation or deactivation state of the scrambling code indication information. Specifically, the network device sends an activation or deactivation instruction to the terminal device, and the terminal device receives the activation or deactivation instruction sent by the network device. The activation instruction is used to activate the scrambling code indication information, and the deactivation instruction is used to deactivate the scrambling code indication information.

In some optional implementations, the activation or deactivation instruction includes at least one of the following: dedicated signaling, a Media Access Control (MAC) Control Element (CE), Downlink Control Information (DCI), a paging short message, and a paging message.

In a case that the scrambling code indication information is activated, the terminal device acquires at least one scrambling code sequence on the basis of a scrambling code format of at least one scrambling code category determined by the scrambling code indication information. Further, the terminal device demodulates or scrambles a corresponding physical resource using the at least one scrambling code sequence.

In a case that the scrambling code indication information is deactivated, the terminal device acquires at least one scrambling code sequence on the basis of a scrambling code format of at least one scrambling code category that is determined in a default or protocol predefined manner. Further, the terminal device demodulates or scrambles a corresponding physical resource using the at least one scrambling code sequence. Here, predefined information is used to determine the default scrambling code format of the at least one scrambling code category or the scrambling code format of the at least one scrambling code category that is defined by protocol.

Here, the physical resource includes at least one of the following resources: a paging channel resource, a broadcast channel resource, a downlink shared channel resource, an uplink shared channel resource, and a random access channel resource. The type of the physical resource is not limited in the present application.

With the technical solution of the embodiments of the present application, the terminal device acquires the scrambling code format used by the terminal device itself by receiving the scrambling code indication information of the network device, generates or selects the respective scrambling code sequence using the scrambling code format, and demodulates or scrambles the corresponding physical resource using the scrambling code sequence, which reduces the average error rate of the communication system, and improves the user experience.

Figure 3:
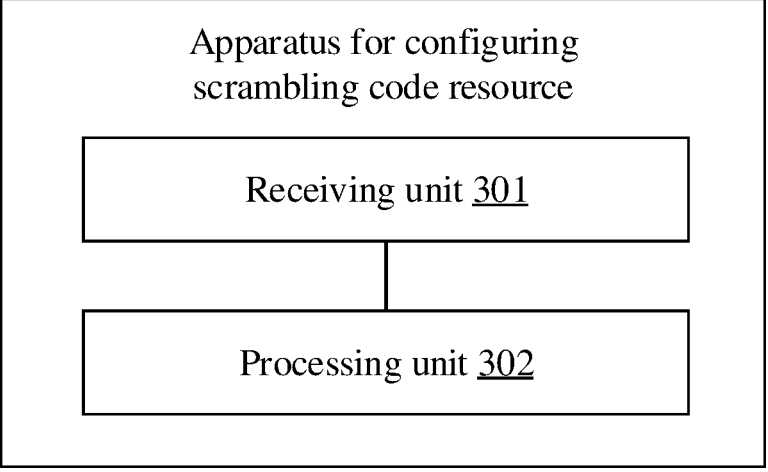
FIG. 3 is a first schematic structural composition diagram of an apparatus for configuring a scrambling code resource provided in an embodiment of the present application.

FIG. 3 is a first schematic structural composition diagram of an apparatus for configuring a scrambling code resource provided in an embodiment of the present application, which is applied to a terminal device. As shown in FIG. 3, the apparatus for configuring the scrambling code resource includes: a receiving unit 301 and a processing unit 302.

The receiving unit 301 is configured to receive scrambling code indication information sent by a network device, the scrambling code indication information being used to determine a scrambling code format of at least one scrambling code category.

The processing unit 302 is configured to acquire at least one scrambling code sequence on the basis of a scrambling code format of at least one scrambling code category determined by the scrambling code indication information. Each of the at least one scrambling code sequence is used to demodulate or scramble a physical resource corresponding to the scrambling code sequence.

In some optional implementations, the scrambling code indication information includes bit mapping information for indicating a scrambling code format of at least one scrambling code category.

In some optional implementations, the bit mapping information includes at least one bit, each bit of the at least one bit or a bit combination formed by a plurality of bits is associated with one or more scrambling code categories, and the value of each bit or the bit combination is used to indicate a scrambling code format of the one or more scrambling code categories associated with each bit or the bit combination.

In some optional implementations, the association relationship between each bit or the bit combination in the scrambling code indication information and one or more scrambling code categories is a first association relationship.

The first association relationship is predefined; or, the first association relationship is configured by the network device by means of AS signaling.

In some optional implementations, all bits in the bit mapping information are associated with at least one scrambling code category, the at least one scrambling code category and the terminal types have a second association relationship, and the second association relationship includes that:

all scrambling code categories of the at least one scrambling code category are associated with a group of terminal types; or, each scrambling code category of the at least one scrambling code category is associated with a group of terminal types; or, multiple scrambling code categories of the at least one scrambling code category are associated with a group of terminal types.

In some optional implementations, the second association relationship is predefined; or, the second association relationship is configured by the network device by means of AS signaling.

In some optional implementations, the processing unit 302 is configured to determine a scrambling code format of at least one scrambling code category on the basis of the first association relationship and the bit mapping information; and acquire at least one scrambling code sequence on the basis of the scrambling code format of the at least one scrambling code category.

In some optional implementations, the processing unit 302 is configured to determine that its own terminal type of the terminal device is a first terminal type; if it is determined on the basis of the second association relationship that the first terminal type belongs to the group of terminal types, determine, on the basis of the first association relationship and the bit mapping information, a scrambling code format of at least one scrambling code category associated with the group of terminal types; and acquire the at least one scrambling code sequence on the basis of the scrambling code format of the at least one scrambling code category.

In some optional implementations, the processing unit 302 is configured to determine that its own terminal type of the terminal device is a first terminal type; if it is determined on the basis of the second association relationship that the first terminal type does not belong to the group of terminal types, determine a scrambling code format of the at least one scrambling code category on the basis of a default or protocol predefined manner; and acquire the at least one scrambling code sequence on the basis of the scrambling code format of the at least one scrambling code category.

In some optional implementations, the scrambling code indication information includes first configuration information for indicating a scrambling code format of at least one scrambling code category.

In some optional implementations, the first configuration information includes at least one configuration entry, each of the at least one configuration entry includes indication information of one or more scrambling code categories and scrambling code format configuration information, and the scrambling code format configuration information is used to determine the scrambling code format of the one or more scrambling code categories.

In some optional implementations, the indication information of the scrambling code category is a number of the scrambling code category; or, the indication information of the scrambling code category is identifier information of the scrambling code category.

In some optional implementations, the first configuration information includes at least one configuration entry, each of the at least one configuration entry includes scrambling code format configuration information associated with one or more scrambling code categories, and the scrambling code format configuration information is used to determine the scrambling code format of the one or more scrambling code categories associated.

In some optional implementations, the association relationship between the scrambling code format configuration information and the one or more scrambling code categories is determined on the basis of predefined information.

In some optional implementations, the at least one configuration entry in the first configuration information and the terminal types have a third association relationship, and the third association relationship includes that:

all configuration entries in the first configuration information are associated with a group of terminal types; or, each configuration entry in the first configuration information is associated with a group of terminal types; or, multiple configuration entries in the first configuration information are associated with a group of terminal types.

In some optional implementations, the third association relationship is predefined; or, the third association relationship is configured by the network device by means of AS signaling.

In some optional implementations, the processing unit 302 is configured to determine the scrambling code format of the at least one scrambling code category on the basis of the first configuration information; and acquire the at least one scrambling code sequence on the basis of the scrambling code format of the at least one scrambling code category.

In some optional implementations, the processing unit 302 is configured to determine that its own terminal type is a first terminal type; if it is determined on the basis of the third association relationship that the first terminal type belongs to the group of terminal types, determine the scrambling code format of the at least one scrambling code category on the basis of a configuration entry in the first configuration information having an association relationship with the group of terminal types; and acquire the at least one scrambling code sequence on the basis of the scrambling code format of the at least one scrambling code category.

In some optional implementations, the processing unit 302 is configured to determine that its own terminal type is a first terminal type; if it is determined on the basis of the third association relationship that the first terminal type does not belong to the group of terminal types, determine the scrambling code format of the at least one scrambling code category on the basis of a default or protocol predefined manner; and acquire the at least one scrambling code sequence on the basis of the scrambling code format of the at least one scrambling code category.

In some optional implementations, the processing unit 302 is configured to determine, on the basis of a capability supported by the terminal device, that its own terminal type is the first terminal type; or determine, on the basis of predefined information, that its own terminal type is the first terminal type; or determine, on the basis of NAS signaling, that its own terminal type is the first terminal type.

In some optional implementations, the processing unit 302 is further configured to determine demodulate or scramble a physical resource corresponding to the scrambling code sequence on the basis of at least a part of scrambling code sequence in the at least one scrambling code sequence.

In some optional implementations, the physical resource includes at least one of the following resources:

a paging channel resource, a broadcast channel resource, a downlink shared channel resource, an uplink shared channel resource, and a random access channel resource.

In some optional implementations, the scrambling code indication information is carried in system broadcast information or dedicated signaling.

In some optional implementations, the receiving unit 301 is further configured to receive an activation or deactivation instruction sent by the network device. The activation instruction is used to activate the scrambling code indication information, and the deactivation instruction is used to deactivate the scrambling code indication information.

In some optional implementations, the activation or deactivation instruction includes at least one of the following: dedicated signaling, an MAC CE, DCI, a paging short message, and a paging message.

In some optional implementations, the processing unit 302 is configured to acquire, in a case where the scrambling code indication information is activated, the at least one scrambling code sequence on the basis of the scrambling code format of the at least one scrambling code category determined by the scrambling code indication information.

In some optional implementations, the processing unit 302 is configured to acquire, in a case where the scrambling code indication information is deactivated, the at least one scrambling code sequence on the basis of the scrambling code format of the at least one scrambling code category determined in the default or protocol predefined manner.

In some optional implementations, the at least one scrambling code category includes at least one of the following:

an RAT public type of scrambling codes, a cell public type of scrambling codes, and a terminal granularity type of scrambling codes.

It should be understood by a person skilled in the art that the relevant description of the above apparatus for configuring the scrambling code resource in the embodiment of the present application may be understood with reference to the relevant description of the methods for configuring the scrambling code resource in the embodiments of the present application.

Figure 4:
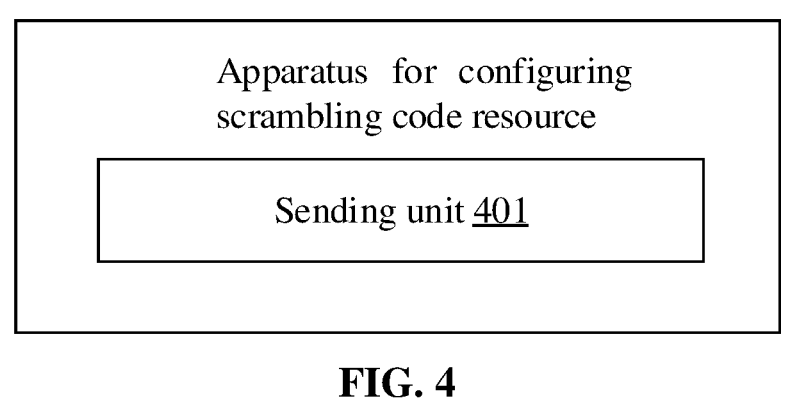

FIG. 4 is a second schematic structural composition diagram of an apparatus for configuring a scrambling code resource provided in an embodiment of the present application, which is applied to a network device. As shown in FIG. 4, the apparatus for configuring the scrambling code resource includes: a sending unit 401.

The sending unit 401 is configured to send scrambling code indication information to a terminal device, the scrambling code indication information being used to determine a scrambling code format of at least one scrambling code category.

The scrambling code format of the at least one scrambling code category is used to acquire at least one scrambling code sequence, and each of the at least one scrambling code sequence is used to demodulate or scramble a physical resource corresponding to the scrambling code sequence.

In some optional implementations, the scrambling code indication information includes bit mapping information for indicating a scrambling code format of at least one scrambling code category.

In some optional implementations, the bit mapping information includes at least one bit, each bit of the at least one bit or a bit combination formed by a plurality of bits is associated with one or more scrambling code categories, and the value of each bit or the bit combination is used to indicate a scrambling code format of the one or more scrambling code categories associated with each bit or the bit combination.

In some optional implementations, the association relationship between each bit or the bit combination in the scrambling code indication information and the one or more scrambling code categories is a first association relationship.

The first association relationship is predefined; or, the first association relationship is configured by the network device by means of AS signaling.

In some optional implementations, all bits in the bit mapping information are associated with at least one scrambling code category, the at least one scrambling code category and the terminal types have an second association relationship, and the second association relationship includes that:

all scrambling code categories of the at least one scrambling code category are associated with a group of terminal types; or, each scrambling code category of the at least one scrambling code category is associated with a group of terminal types; or, multiple scrambling code categories of the at least one scrambling code category are associated with a group of terminal types.

In some optional implementations, the second association relationship is predefined; or, the second association relationship is configured by the network device by means of AS signaling.

In some optional implementations, the scrambling code indication information includes first configuration information for indicating a scrambling code format of at least one scrambling code category.

In some optional implementations, the first configuration information includes at least one configuration entry, each of the at least one configuration entry includes indication information of one or more scrambling code categories and scrambling code format configuration information, and the scrambling code format configuration information is used to determine a scrambling code format of the one or more scrambling code categories.

In some optional implementations, the indication information of the scrambling code category is a number of the scrambling code category; or, the indication information of the scrambling code category is identifier information of the scrambling code category.

In some optional implementations, the first configuration information includes at least one configuration entry, each of the at least one configuration entry includes scrambling code format configuration information associated with one or more scrambling code categories, and the scrambling code format configuration information is used to determine a scrambling code format of the one or more scrambling code categories associated.

In some optional implementations, the association relationship between the scrambling code format configuration information and the one or more scrambling code categories is determined on the basis of predefined information.

In some optional implementations, the at least one configuration entry in the first configuration information and the terminal types have a third association relationship, and the third association relationship includes that:

all configuration entries in the first configuration information are associated with a group of terminal types; or, each configuration entry in the first configuration information is associated with a group of terminal types; or, multiple configuration entries in the first configuration information are associated with a group of terminal types.

In some optional implementations, the third association relationship is predefined; or, the third association relationship is configured by the network device by means of AS signaling.

In some optional implementations, the physical resource includes at least one of the following resources:

a paging channel resource, a broadcast channel resource, a downlink shared channel resource, an uplink shared channel resource, and a random access channel resource.

In some optional implementations, the scrambling code indication information is carried in system broadcast information or dedicated signaling.

In some optional implementations, the sending unit 401 is further configured to send an activation or deactivation instruction to the terminal device. The activation instruction is used to activate the scrambling code indication information, and the deactivation instruction is used to deactivate the scrambling code indication information.

In some optional implementations, the activation or deactivation instruction includes at least one of the following:

dedicated signaling, an MAC CE, DCI, a paging short message, and a paging message.

In some optional implementations, the at least one scrambling code category includes at least one of the following:

an RAT public type of scrambling codes, a cell public type of scrambling codes, and a terminal granularity type of scrambling codes.

It should be understood by a person skilled in the art that the relevant description of the above apparatus for configuring the scrambling code resource in the embodiment of the present application may be understood with reference to the relevant description of the methods for configuring the scrambling code resource in the embodiments of the present application.

Figure 5:
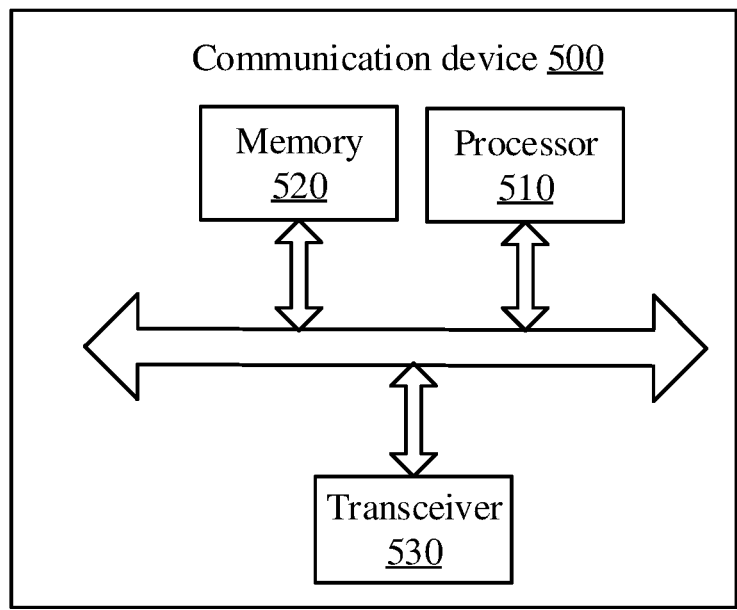
FIG. 5 is a schematic structural diagram of a communication device provided in an embodiment of the present application.

FIG. 5 is a schematic structural diagram of a communication device 500 provided in an embodiment of the present application. The communication device may be a terminal device, or may be a network device. The communication device 500 shown in FIG. 5 includes a processor 510. The processor 510 may invoke and execute a computer program from a memory to implement the method in the embodiments of the present application.

Optionally, as shown in FIG. 5, the communication device 500 may also include a memory 520. The processor 510 may invoke and execute a computer program from the memory 520 to implement the method in the embodiments of the present application.

The memory 520 may be one separate component independent of the processor 510, or may be integrated in the processor 510.

Optionally, as shown in FIG. 5, the communication device 500 may further include a transceiver 530. The processor 510 may control the transceiver 530 to perform communication with other devices. Specifically, the transceiver 630 may send information or data to other devices, or receive information or data sent by other devices.

The transceiver 530 may include a transmitter and a receiver. The transceiver 530 may further include an antenna, and the number of antennas may be one or more.

Optionally, the communication device 500 may specifically be a network device in the embodiments of the present application, and the communication device 500 may implement corresponding processes implemented by the network device in the respective methods of the embodiments of the present application, which will not be repeated here for the sake of brevity.

Optionally, the communication device 500 may specifically be a mobile terminal/terminal device in the embodiments of the present application, and the communication device 500 may implement corresponding processes implemented by the mobile terminal/terminal device in the respective methods of the embodiments of the present application, which will not be repeated here for the sake of brevity.

Figure 6:
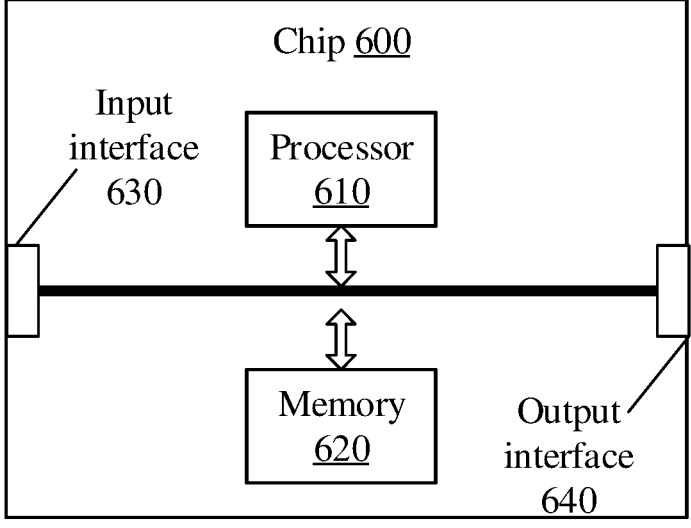
FIG. 6 is a schematic structural diagram of a chip according to an embodiment of the present application.

FIG. 6 is a schematic structural diagram of a chip according to an embodiment of the present application. The chip 600 shown in FIG. 6 includes a processor 610. The processor 610 may invoke and execute a computer program from memory to implement the methods in the embodiments of the present application.

Optionally, as shown in FIG. 6, the chip 600 may further include a memory 620. The processor 610 may invoke and execute a computer program from the memory 620 to implement the methods in the embodiments of the present application.

The memory 620 may be one separate component independent of the processor 610, or may be integrated in the processor 610.

Optionally, the chip 600 may further include an input interface 630. The processor 610 may control the input interface 630 to perform communication with other devices or chips. Specifically, the input interface 630 may obtain information or data sent by other devices or chips.

Optionally, the chip 600 may further include an output interface 640. The processor 610 may control the output interface 640 to perform communication with other devices or chips. Specifically, the output interface 640 may output information or data to other devices or chips.

Optionally, the chip may be applied to a network device in the embodiments of the present application, and the chip may implement corresponding processes implemented by the network device in the respective methods of the embodiments of the present application, which will not be repeated here for the sake of brevity.

Optionally, the chip may be applied to a mobile terminal/ terminal device in the embodiments of the present application, and the chip may implement corresponding processes implemented by the mobile terminal/terminal device in the respective methods of the embodiments of the present application, which will not be repeated here for the sake of brevity.

It should be understood that the chip mentioned in the embodiment of the present application may also be referred to as a system-level chip, a system chip, a chip system, or a system-on-chip chip, or the like.

Figure 7:
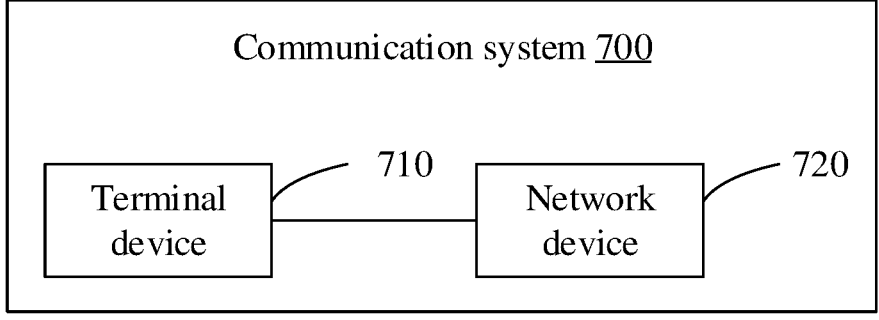
FIG. 7 is a schematic block diagram of a communication system provided in an embodiment of the present application.

FIG. 7 is a schematic block diagram of a communication system 700 provided in an embodiment of the present application. As shown in FIG. 7, the communication system 700 includes a terminal device 710 and a network device 720.

The terminal device 710 may be used for implementing corresponding functions implemented by the terminal device in the methods described above, and the network device 720 may be used for implementing corresponding functions implemented by the network device in the methods described above, which will not be repeated here for the sake of brevity.

In the technical solution of the embodiments of the present application, the terminal device acquires a scrambling code format used by itself according to scrambling code indication information configured by the network device, acquires a corresponding scrambling code sequence using the scrambling code format, and demodulates or scrambles a corresponding physical resource using the scrambling code sequence. With the technical solution of the embodiments of the present application, a reasonable configuration of scrambling code resources is achieved, the average error rate of the communication system is reduced, and the experience of the terminal device is improved.

It should be understood that the processor in the embodiments of the present application may be an integrated circuit chip with a signal processing capability. During implementation, each step in the method embodiments described above may be completed by an integrated logic circuit of hardware in a processor or instructions in the form of software. The above processor may be a general-purpose processor, a Digital Signal Processor (DSP), an Application Specific Integrated Circuit (ASIC), a Field Programmable Gate Array (FPGA) or other programmable logic devices, a discrete gate or transistor logic device, or a discrete hardware component. The various methods, steps, and logical block diagrams disclosed in the embodiments of the present application may be implemented or executed. The general-purpose processor may be a microprocessor, or the processor may also be any conventional processor, etc. The steps of the methods disclosed in combination with the embodiments of the present application may be directly executed and completed by a hardware decoding processor, or executed and completed by a combination of hardware and software modules in the decoding processor. Software modules may be located in a mature storage medium in the present field such as a random access memory, a flash memory, a read-only memory, a programmable read-only memory, an electrically erasable programmable memory, or a register. The storage medium is located in the memory, and the processor reads the information in the memory, and completes the steps of the above methods in combination with its hardware.

It can be understood that the memory in the embodiments of the present application may be a volatile memory or a nonvolatile memory, or may include both volatile and non-volatile memories. The non-volatile memory may be a Read-Only Memory (ROM), a programmable read-only memory (Programmable ROM, PROM), an erasable programmable read-only memory (Erasable PROM, EPROM), an electrically programmable Erase Programmable Read-Only Memory (Electrically EPROM, EEPROM) or a flash memory. The volatile memory may be Random Access Memory (RAM), which acts as an external cache. By way of example, but not by way of limitation, many forms of RAMs are available, such as static random access memories (Static RAM, SRAM), dynamic random access memories (Dynamic RAM, DRAM), synchronous dynamic random access memories (Synchronous DRAM, SDRAM), double data rate synchronous dynamic random access memories (Double Data Rate SDRAM, DDR SDRAM), enhanced synchronous dynamic random access memories (Enhanced SDRAM, ESDRAM), synchronous link dynamic random access memories (Synchlink DRAM, SLDRAM) and direct memory bus random access memories (Direct Rambus RAM, DR RAM). It should be noted that the memory in the systems and methods described herein is intended to include, but is not limited to, the foregoing and any other suitable type of memory.

It should be understood that the above-mentioned memory is illustrative but not restrictive. For example, the memory in the embodiments of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), a direct memory bus random access memory (Direct Rambus RAM, DR RAM), or the like. That is, the memory in the embodiments of the present application is intended to include, but is not limited to, the foregoing and any other suitable type of memory.

A computer-readable storage medium for storing a computer program is further provided in an embodiment of the present application.

Optionally, the computer-readable storage medium may be applied to a network device in the embodiments of the present application, and the computer program causes a computer to perform corresponding processes implemented by the network device in the respective methods of the embodiments of the present application, which will not be repeated here for the sake of brevity.

Optionally, the computer-readable storage medium may be applied to a mobile terminal/terminal device in the embodiments of the present application, and the computer program causes a computer to perform corresponding processes implemented by the mobile terminal/terminal device in the respective methods of the embodiments of the present application, which will not be repeated here for the sake of brevity.

A computer program product including computer program instructions is further provided in an embodiment of the present application.

Optionally, the computer program product may be applied to a network device in the embodiments of the present application, and the computer program instructions cause a computer to perform corresponding processes implemented by the network device in the respective methods of the embodiments of the present application, which will not be repeated here for the sake of brevity.

Optionally, the computer program product may be applied to a mobile terminal/terminal device in the embodiments of the present application, and the computer program instructions cause a computer to perform corresponding processes implemented by the mobile terminal/terminal device in the respective methods of the embodiments of the present application, which will not be repeated here for the sake of brevity.

A computer program is further provided in an embodiment of the present application.

Optionally, the computer program may be applied to a network device in the embodiments of the present application, and the computer program, when run on a computer, causes the computer to perform corresponding processes implemented by the network device in the respective methods of the embodiments of the present application, which will not be repeated here for the sake of brevity.

Optionally, the computer program may be applied to a mobile terminal/terminal device in the embodiments of the present application, and the computer program, when run on a computer, causes the computer to perform corresponding processes implemented by the mobile terminal/terminal device in the respective methods of the embodiments of the present application, which will not be repeated here for the sake of brevity.

A person skilled in the art can appreciate that the units and algorithm steps of the examples described in combination with the embodiments disclosed herein can be implemented by electronic hardware, or a combination of computer software and electronic hardware. These functions are executed in hardware or software, depending on the specific applications and design constraints of the technical solutions. A professional skilled person may use different methods for each specific application to implement the described functions, but said implementation should not be considered to exceed the scope of the present application.

It can be clearly understood by a person skilled in the art that for the convenience and brevity of the description, reference may be made to the corresponding processes in the foregoing method embodiments for the specific working process of the systems, apparatuses and units described above, which will not be repeated here.

In several embodiments provided by the present application, it should be understood that the disclosed systems, apparatuses, and methods may be implemented by other means. For example, the apparatus embodiments described above are merely illustrative. For example, the division of the units is only a logical function division. During actual implementation, there may be other division methods. For example, a plurality of units or components may be combined or integrated into another system, or some features may be ignored or not implemented. In another point, the displayed or discussed coupling or direct coupling or communication connections may be through some interfaces, and the indirect coupling or communication connections of apparatuses or units may be in electrical, mechanical or other forms.

The units described as separate components may or may not be physically separated, and the components displayed as units may or may not be physical units, that is, they may be located in one place, or may be distributed to a plurality of network units. A part or all of the units may be selected according to actual needs to achieve the objective of the solution of the present embodiment.

In addition, the functional units in various embodiments of the present application may be integrated in one processing unit, or each unit may be individually physically present, or two or more units may be integrated into one unit.

If the functions described above are implemented in the form of software function units and sold or used as separate products, they may be stored in a computer-readable storage medium. On the basis of such understanding, a part of the technical solutions of the present application that essentially contributes to the prior art, or a part of the technical solutions may be embodied in the form of a software product, and the computer software product is stored in a storage medium, including several instructions used for making a computer device (which may be a personal computer, a server, a network device or the like) perform all or part of the steps of the methods described in the various embodiments of the present application. The forgoing storage medium includes: a U disk, a mobile hard disk, a Read-Only Memory (ROM), a Random Access Memory (RAM), a magnetic disk, an optical disk, or other media that can store program codes.

The detailed descriptions of the present application are merely described above, but the scope of protection of the present application is not limited thereto. Any person skilled in the art can easily conceive of changes or substitutions within the technical scope disclosed in the present application, and all of the changes or substitutions should be covered by the scope of protection of the present application. Therefore, the scope of protection of the present application should be defined by the scope of protection of the claims.

The invention claimed is:

1. A method for configuring a scrambling code resource, the method comprising:
   receiving, by a terminal device, scrambling code indication information sent by a network device, the scrambling code indication information being used to determine a scrambling code format of at least one scrambling code category; and
   acquiring, by the terminal device, at least one scrambling code sequence on the basis of the scrambling code format of the at least one scrambling code category determined by the scrambling code indication information, wherein each of the at least one scrambling code sequence is used to demodulate or scramble a physical resource corresponding to the scrambling code sequence, the method further comprising:

receiving, by the terminal device, an activation instruction or a deactivation instruction sent by the network device, wherein the activation instruction is used to activate the scrambling code indication information, and the deactivation instruction is used to deactivate the scrambling code indication information, wherein the activation instruction or the deactivation instruction comprises at least one of the following: dedicated signaling, a media access control (MAC) control element (CE), downlink control information (DCI), a paging short message, and a paging message.

2. The method according to claim 1, wherein the scrambling code indication information comprises bit mapping information for indicating the scrambling code format of the at least one scrambling code category, wherein the bit mapping information comprises at least one bit, each bit of the at least one bit or a bit combination formed by a plurality of bits is associated with one or more scrambling code categories, and a value of the bit or the bit combination is used to indicate a scrambling code format of the one or more scrambling code categories associated with the bit or the bit combination, wherein an association relationship between each bit or the bit combination in the scrambling code indication information and the one or more scrambling code categories is a first association relationship;

the first association relationship is predefined; or, the first association relationship is configured by the network device by means of access stratum (AS) signaling.

3. The method of claim 1, wherein the scrambling code indication information comprises first configuration information for indicating the scrambling code format of the at least one scrambling code category, wherein the first configuration information comprises at least one configuration entry, each of the at least one configuration entry comprises indication information of one or more scrambling code categories and scrambling code format configuration information, and the scrambling code format configuration information is used to determine a scrambling code format of the one or more scrambling code categories, wherein the indication information of the scrambling code category is a number of the scrambling code category; or the indication information of the scrambling code category is identifier information of the scrambling code category, or wherein the first configuration information comprises at least one configuration entry, each of the at least one configuration entry is associated with one or more scrambling code categories, each of the at least one configuration entry comprises scrambling code format configuration information, and the scrambling code format configuration information is used for determining the scrambling code format of the one or more scrambling code categories associated, wherein an association relationship between the scrambling code format configuration information and the one or more scrambling code categories is determined on the basis of predefined information.

4. The method according to claim 3, wherein the at least one configuration entry in the first configuration information and terminal types have a third association relationship, and the third association relationship comprises that:

all configuration entries in the first configuration information are associated with a group of terminal types; or, each configuration entry in the first configuration information is associated with a group of terminal types; or, multiple configuration entries in the first configuration information are associated with a group of terminal types, wherein the third association relationship is predefined; or the third association relationship is configured by the network device by means of AS signaling.

5. The method according to claim 4, wherein acquiring, by the terminal device, the at least one scrambling code sequence on the basis of the scrambling code format of the at least one scrambling code category determined by the scrambling code indication information, comprises:

determining, by the terminal device, that its own terminal type is a first terminal type;

in response to determining, on the basis of the third association relationship, that the first terminal type belongs to the group of terminal types, determining, by the terminal device, the scrambling code format of the at least one scrambling code category on the basis of a configuration entry in the first configuration information having an association relationship with the group of terminal types; and acquiring, by the terminal device, the at least one scrambling code sequence on the basis of the scrambling code format of the at least one scrambling code category, or in response to determining, on the basis of the third association relationship, that the first terminal type does not belong to the group of terminal types, determining, by the terminal device, the scrambling code format of the at least one scrambling code category on the basis of a default or protocol predefined manner; and acquiring, by the terminal device, the at least one scrambling code sequence on the basis of the scrambling code format of the at least one scrambling code category.

6. The method according to claim 1, wherein acquiring, by the terminal device, the at least one scrambling code sequence on the basis of the scrambling code format of the at least one scrambling code category determined by the scrambling code indication information, comprises:

in a case where the scrambling code indication information is activated, acquiring, by the terminal device, the at least one scrambling code sequence on the basis of the scrambling code format of the at least one scrambling code category determined by the scrambling code indication information, or in a case where the scrambling code indication information is deactivated, acquiring, by the terminal device, the at least one scrambling code sequence on the basis of the scrambling code format of the at least one scrambling code category determined in a default or protocol predefined manner.

7. A terminal device, comprising: a processor and a memory for storing a computer program, wherein the processor is configured to invoke and execute the computer program from the memory to cause the terminal device to:

receive scrambling code indication information sent by a network device, the scrambling code indication information being used to determine a scrambling code format of at least one scrambling code category; and acquire at least one scrambling code sequence on the basis of a scrambling code format of at least one scrambling code category determined by the scrambling code indication information, wherein each of the at least one scrambling code sequence is used to demodulate or scramble a physical resource corresponding to the scrambling code sequence, wherein the processor is further configured to invoke and execute the computer program from the memory to cause the terminal device to receive an activation instruction or a deactivation instruction sent by the network device, the activation instruction being used to activate the scrambling code indication information, and the deactivation instruction being used to deactivate the scrambling code indication information, wherein the activation instruction or the deactivation instruction comprises at least one of: dedicated signaling, a media access control (MAC) control element (CE), downlink control information (DCI), a paging short message, and a paging message.

8. The terminal device of claim 7, wherein the scrambling code indication information comprises bit mapping information for indicating the scrambling code format of the at least one scrambling code category, wherein the bit mapping information comprises at least one bit, each bit of the at least one bit or a bit combination formed by a plurality of bits is associated with one or more scrambling code categories, and a value of the bit or the bit combination is used to indicate a scrambling code format of the one or more scrambling code categories associated with the bit or the bit combination, wherein an association relationship between each bit or the bit combination in the scrambling code indication information and the one or more scrambling code categories comprises a first association relationship;

the first association relationship is predefined; or, the first association relationship is configured by the network device by means of access stratum (AS) signaling.

9. The terminal device of claim 8, wherein all bits in the bit mapping information are associated with at least one scrambling code category, the at least one scrambling code category and terminal types have a second association relationship, and the second association relationship comprises that:

all scrambling code categories of the at least one scrambling code category are associated with a group of terminal types; or, each scrambling code category of the at least one scrambling code category is associated with a group of terminal types; or, multiple scrambling code categories of the at least one scrambling code category are associated with a group of terminal types, wherein the second association relationship is predefined; or the second association relationship is configured by the network device by means of AS signaling.

10. The terminal device of claim 8, wherein the processor is configured to invoke and execute the computer program from the memory to cause the terminal device to:

determine the scrambling code format of the at least one scrambling code category on the basis of the first association relationship and the bit mapping information; and acquire the at least one scrambling code sequence on the basis of the scrambling code format of the at least one scrambling code category.

11. The terminal device of claim 9, wherein the processor is configured to invoke and execute the computer program from the memory to cause the terminal device to:

determine that its own terminal type of the terminal device is a first terminal type;

in response to determining, on the basis of the second association relationship, that the first terminal type belongs to the group of terminal types, determine, on the basis of the first association relationship and the bit mapping information, a scrambling code format of the at least one scrambling code category associated with the group of terminal types; and acquire the at least one scrambling code sequence on the basis of the scrambling code format of the at least one scrambling code category, or wherein the processor is configured to invoke and execute the computer program from the memory to cause the terminal device to:

determine that its own terminal type of the terminal device is a first terminal type;

in response to determining, on the basis of the second association relationship, that the first terminal type does not belong to the group of terminal types, determine a scrambling code format of the at least one scrambling code category on the basis of a default or protocol predefined manner; and acquire the at least one scrambling code sequence on the basis of the scrambling code format of the at least one scrambling code category.

12. The terminal device of claim 7, wherein the scrambling code indication information comprises first configuration information for indicating the scrambling code format of the at least one scrambling code category, wherein the first configuration information comprises at least one configuration entry, each of the at least one configuration entry comprises indication information of one or more scrambling code categories and scrambling code format configuration information, and the scrambling code format configuration information is used to determine a scrambling code format of the one or more scrambling code categories, wherein the indication information of the scrambling code category is a number of the scrambling code category; or the indication information of the scrambling code category is identifier information of the scrambling code category, or wherein the first configuration information comprises at least one configuration entry, each of the at least one configuration entry comprises scrambling code format configuration information associated with one or more scrambling code categories, and the scrambling code format configuration information is used to determine the scrambling code format of the one or more scrambling code categories associated, wherein an association relationship between the scrambling code format configuration information and the one or more scrambling code categories is determined on the basis of predefined information.

13. The terminal device of claim 12, wherein the at least one configuration entry in the first configuration information and terminal types have a third association relationship, and the third association relationship comprises that:

all configuration entries in the first configuration information are associated with a group of terminal types; or, each configuration entry in the first configuration information is associated with a group of terminal types; or, multiple configuration entries in the first configuration information are associated with a group of terminal types, wherein the third association relationship is predefined; or the third association relationship is configured by the network device by means of AS signaling.

14. The terminal device of claim 13, wherein the processor is configured to invoke and execute the computer program from the memory to cause the terminal device to:

determine that its own terminal type of the terminal device is a first terminal type;

in response to determining, on the basis of the third association relationship, that the first terminal type belongs to the group of terminal types, determine the scrambling code format of the at least one scrambling code category on the basis of a configuration entry in the first configuration information having an association relationship with the group of terminal types; and acquire the at least one scrambling code sequence on the basis of the scrambling code format of the at least one scrambling code category, or wherein the processor is configured to invoke and execute the computer program from the memory to cause the terminal device to:

determine that its own terminal type of the terminal device is a first terminal type;

in response to determining, on the basis of the third association relationship, that the first terminal type does not belong to the group of terminal types, determine the scrambling code format of the at least one scrambling code category on the basis of a default or protocol predefined manner; and acquire the at least one scrambling code sequence on the basis of the scrambling code format of the at least one scrambling code category.

15. A network device, comprising: a processor and a memory for storing a computer program, wherein the processor is configured to invoke and execute the computer program from the memory to cause the network device to:

send scrambling code indication information to a terminal device, the scrambling code indication information being used to determine a scrambling code format of at least one scrambling code category;

wherein the scrambling code format of the at least one scrambling code category is used to acquire at least one scrambling code sequence, and each of the at least one scrambling code sequence is used to demodulate or scramble a physical resource corresponding to the scrambling code sequence, wherein the processor is further configured to invoke and execute the computer program from the memory to cause the network device to send an activation instruction or a deactivation instruction to the terminal device, the activation instruction being used to activate the scrambling code indication information, and the deactivation instruction being used to deactivate the scrambling code indication information, wherein the activation instruction or the deactivation instruction comprises at least one of: dedicated signaling, a media access control (MAC) control element (CE), downlink control information (DCI), a paging short message, and a paging message.

16. The network device of claim 15, wherein the scrambling code indication information comprises bit mapping information for indicating the scrambling code format of the at least one scrambling code category, wherein the bit mapping information comprises at least one bit, each bit of the at least one bit or a bit combination formed by a plurality of bits is associated with one or more scrambling code categories, and a value of the bit or the bit combination is used to indicate a scrambling code format of the one or more scrambling code categories associated with the bit or the bit combination.

17. The network device of claim 15, wherein the scrambling code indication information comprises first configuration information for indicating the scrambling code format of the at least one scrambling code category, wherein the first configuration information comprises at least one configuration entry, each of the at least one configuration entry comprises indication information of one or more scrambling code categories and scrambling code format configuration information, and the scrambling code format configuration information is used to determine a scrambling code format of the one or more scrambling code categories, wherein the indication information of the scrambling code category is a number of the scrambling code category; or, the indication information of the scrambling code category is identifier information of the scrambling code category, or wherein the first configuration information comprises at least one configuration entry, each of the at least one configuration entry comprises scrambling code format configuration information associated with one or more scrambling code categories, and the scrambling code format configuration information is used to determine a scrambling code format of the one or more scrambling code categories associated, wherein an association relationship between the scrambling code format configuration information and the one or more scrambling code categories is determined on the basis of predefined information.

18. The network device of claim 16, wherein all bits in the bit mapping information are associated with at least one scrambling code category, the at least one scrambling code category and terminal types have a second association relationship, and the second association relationship comprises that:

all scrambling code categories of the at least one scrambling code category are associated with a group of terminal types; or, each scrambling code category of the at least one scrambling code category is associated with a group of terminal types; or, multiple scrambling code categories of the at least one scrambling code category are associated with a group of terminal types, wherein the second association relationship is predefined; or the second association relationship is configured by the network device by means of AS signaling.

19. The network device of claim 17, wherein the at least one configuration entry in the first configuration information and terminal types have a third association relationship, and the third association relationship comprises that:

all configuration entries in the first configuration information are associated with a group of terminal types; or, each configuration entry in the first configuration information is associated with a group of terminal types; or, multiple configuration entries in the first configuration information are associated with a group of terminal types, wherein the third association relationship is predefined; or the third association relationship is configured by the network device by means of AS signaling.

\*   \*   \*   \*   \*